United States Patent
Oseki

(10) Patent No.: US 12,226,937 B2
(45) Date of Patent: Feb. 18, 2025

(54) MOLD RELEASE FILM, FILM LAMINATE, METHOD FOR PRODUCING MOLD RELEASE FILM, AND METHOD FOR PRODUCING FILM LAMINATE

(71) Applicant: Mitsubishi Chemical Corporation, Tokyo (JP)

(72) Inventor: Yosuke Oseki, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 349 days.

(21) Appl. No.: 17/582,487

(22) Filed: Jan. 24, 2022

(65) Prior Publication Data
US 2022/0143877 A1    May 12, 2022

Related U.S. Application Data

(63) Continuation of application No. PCT/JP2020/016391, filed on Apr. 14, 2020.

(30) Foreign Application Priority Data

Jul. 29, 2019  (JP) .................................. 2019-138531

(51) Int. Cl.
*B29C 37/00*    (2006.01)
*B32B 7/12*    (2006.01)
(Continued)

(52) U.S. Cl.
CPC ............ *B29C 37/0075* (2013.01); *B32B 7/12* (2013.01); *B32B 27/283* (2013.01); *C08G 77/08* (2013.01);
(Continued)

(58) Field of Classification Search
None
See application file for complete search history.

(56) References Cited

U.S. PATENT DOCUMENTS

| 4,959,430 A | 9/1990 | Jonas et al. |
| 4,987,042 A | 1/1991 | Jonas et al. |

(Continued)

FOREIGN PATENT DOCUMENTS

| CN | 102597118 A | 7/2012 |
| CN | 107201172 A | 9/2017 |

(Continued)

OTHER PUBLICATIONS

International Search Report issued Jun. 23, 2020 in PCT/JP2020/016391 filed on Apr. 14, 2020, citing documents AF, AH & AS-AV, 5 pages (with English Translation).

(Continued)

*Primary Examiner* — Mohammad M Ameen
(74) *Attorney, Agent, or Firm* — Oblon, McClelland, Maier & Neustadt, L.L.P.

(57) ABSTRACT

A mold release film, including a mold release layer formed by curing a mold release layer composition containing a curable silicone having a fluorine substituent, a curable silicone having no fluorine substituent, and a curing catalyst, on at least one surface of a substrate film. In a concentration distribution of fluorine atoms in a thickness direction within the mold release layer, fluorine atoms are unevenly distributed on a surface of the mold release layer, and a fluorine atom concentration on one side of the mold release layer is 39.0 atom concentration % or more.

26 Claims, 3 Drawing Sheets

(51) Int. Cl.
 *B32B 27/28* (2006.01)
 *C08G 77/08* (2006.01)
 *C08G 77/24* (2006.01)
 *C08J 5/18* (2006.01)

(52) U.S. Cl.
 CPC ............... *C08G 77/24* (2013.01); *C08J 5/18* (2013.01); *B29K 2883/00* (2013.01); *B32B 2307/748* (2013.01); *C08J 2383/04* (2013.01)

(56) References Cited

U.S. PATENT DOCUMENTS

| | | | |
|---|---|---|---|
| 5,035,926 | A | 7/1991 | Jonas et al. |
| 5,391,472 | A | 2/1995 | Muys et al. |
| 6,225,040 | B1 | 5/2001 | Muys et al. |
| 9,206,317 | B2 | 12/2015 | Seth et al. |
| 10,494,484 | B2 | 12/2019 | Hori et al. |
| 10,563,063 | B2 | 2/2020 | Tsuchida |
| 2005/0038183 | A1 | 2/2005 | Ahn et al. |
| 2006/0014915 | A1 | 1/2006 | Ahn et al. |
| 2012/0219794 | A1* | 8/2012 | Seth ............... C08L 83/08 428/352 |
| 2016/0368177 | A1* | 12/2016 | Kasai ............... B32B 27/322 |
| 2017/0190939 | A1 | 7/2017 | Hori et al. |
| 2018/0086915 | A1* | 3/2018 | Tsuchida ........... B32B 27/00 |

FOREIGN PATENT DOCUMENTS

| | | | |
|---|---|---|---|
| CN | 107429145 | A | 12/2017 |
| EP | 0 602 731 | A2 | 6/1994 |
| JP | 01-313521 | A | 12/1989 |
| JP | 06-295016 | A | 10/1994 |
| JP | 07-292081 | A | 11/1995 |
| JP | 2000-006324 | A | 1/2000 |
| JP | 2011-201035 | A | 10/2011 |
| JP | 2012-196846 | A | 10/2012 |
| JP | 2013-510921 | A | 3/2013 |
| JP | 2015 183041 | A * | 10/2015 |
| JP | 2019-116013 | A | 7/2019 |
| JP | 2020-100764 | A | 7/2020 |
| KR | 10-1124998 | B1 | 3/2012 |
| KR | 10-2017-0029585 | A | 3/2017 |
| KR | 10-2018-0035867 | A | 4/2018 |
| KR | 10-2019-0023267 | A | 3/2019 |
| WO | WO 2016/152992 | A1 | 9/2016 |
| WO | WO 2019/117059 | A1 | 6/2019 |

OTHER PUBLICATIONS

"The latest trends in conductive polymer technology", Toray Research Center, Inc., Jun. 1999, 14 pages (with English Machine Translation).

"Safety Evaluation Test Methods for Polymers (Flow Scheme for Polymers)", National Institute of Technology and Evaluation, Nov. 1985, 5 pages (with English Machine Translation).

Third party submission issued May 4, 2023, in corresponding Korean Patent Application No. 10-2022-7006603 (with English Translation), citing documents 15-19 therein, 117 pages.

Japanese Office Action issued Mar. 5, 2024 in Japanese Patent Application No. 2021-536610 (with unedited computer-generated English Translation), citing references 15 therein, 10 pages.

Combined Chinese Office Action and Search Report issued Mar. 28, 2024 in Chinese Patent Application No. 202080041368.6 (with unedited computer-generated English translation), citing references 15-18 therein, 21 pages.

* cited by examiner

[FIG. 1]
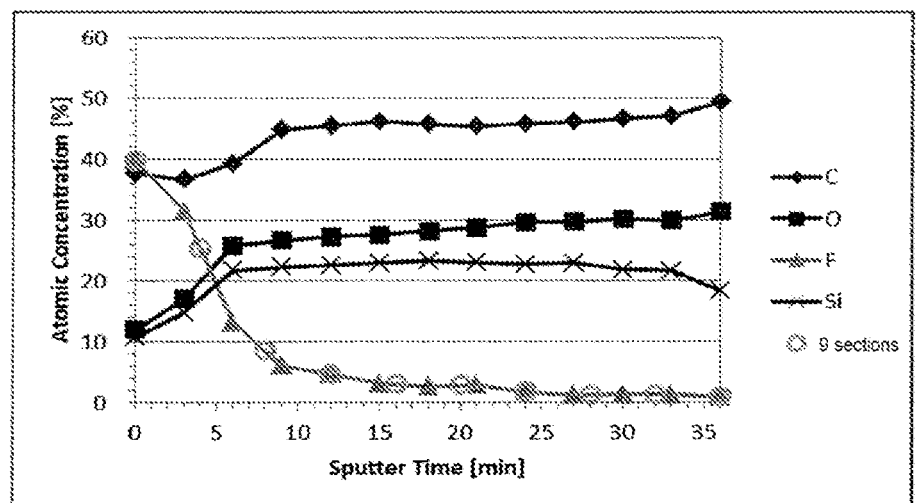
[FIG. 2]
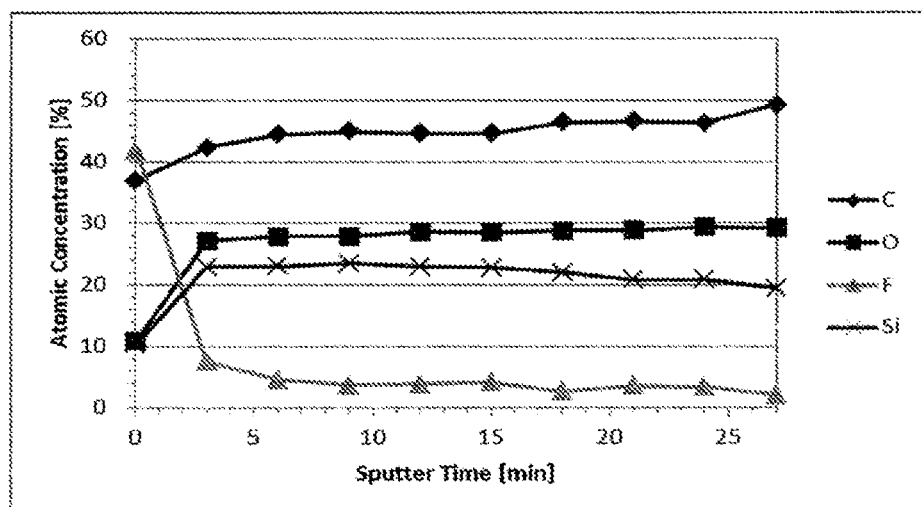

[FIG. 3]
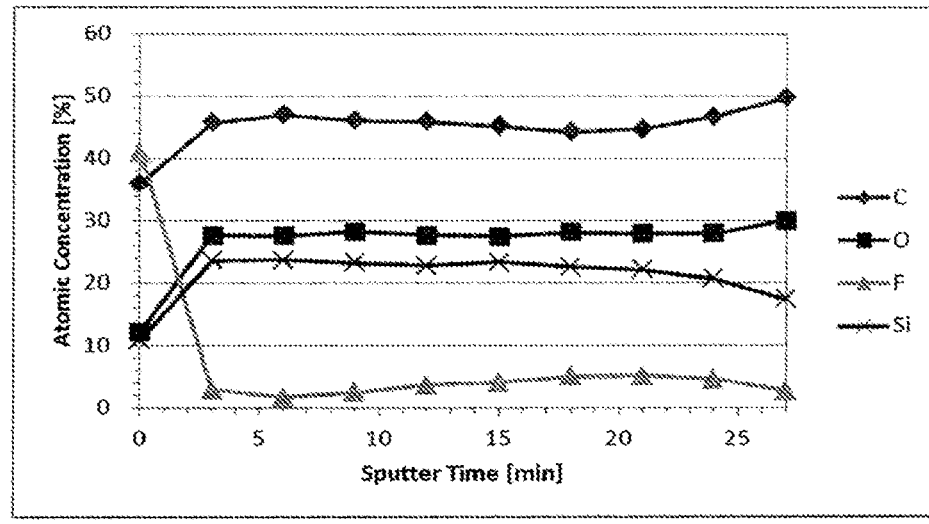
[FIG. 4]
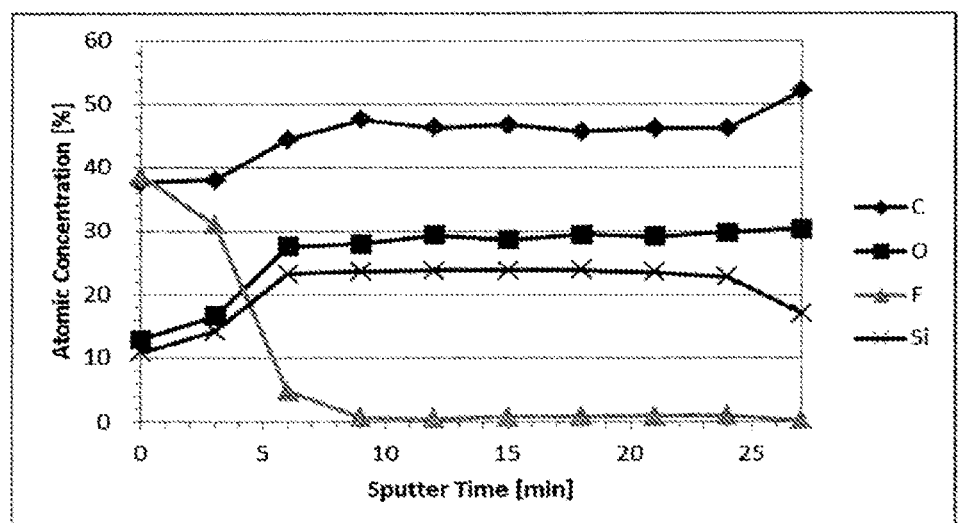

[FIG. 5]
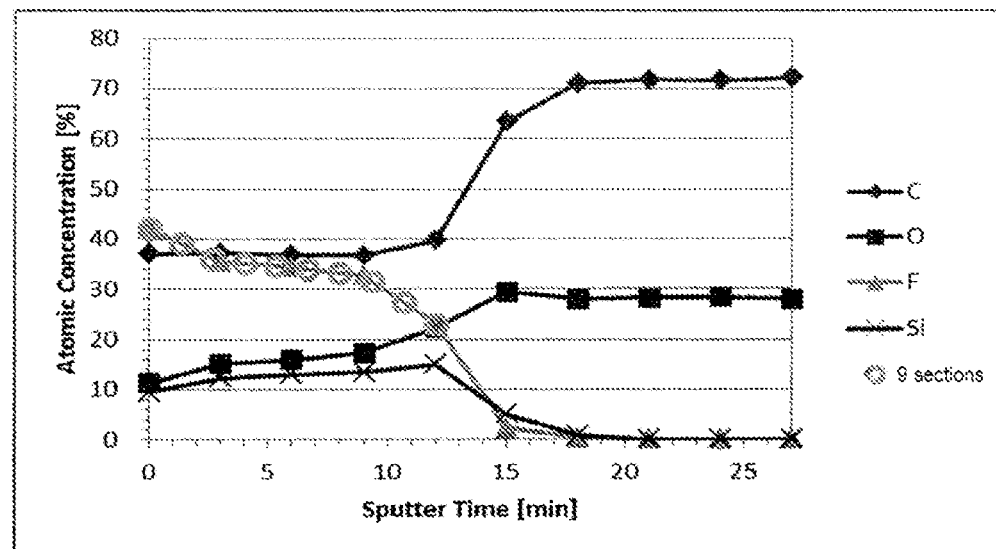
[FIG. 6]
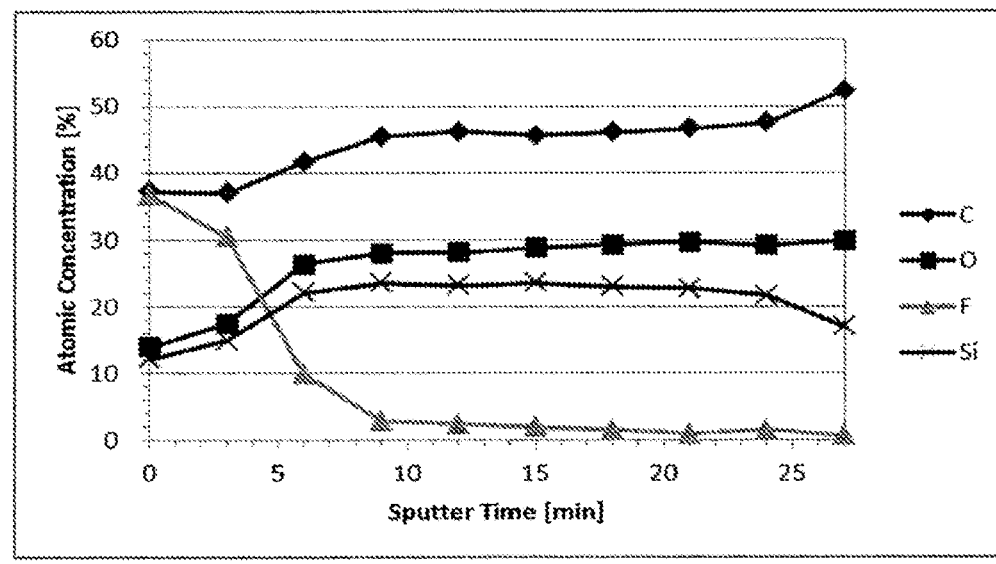

MOLD RELEASE FILM, FILM LAMINATE, METHOD FOR PRODUCING MOLD RELEASE FILM, AND METHOD FOR PRODUCING FILM LAMINATE

CROSS-REFERENCE TO RELATED APPLICATIONS

The present application is a by-pass continuation of international application PCT/JP2020/016391, filed on Apr. 14, 2020, and claims the benefit of the filing date of Japanese Appl. No. 2019-138531, filed on Jul. 29, 2019.

TECHNICAL FIELD

The present invention relates to a mold release film, a film laminate using the mold release film, a method for producing these, and a method for using these.

BACKGROUND ART

In recent years, the number of automobiles equipped with a liquid crystal panel is increasing. In such in-vehicle applications, liquid crystal panels are often exposed to high and low temperatures for a long period of time, and adhesives for bonding panel-constituting members are also required to have a high level of weather and heat resistance. As an adhesive suitable for this purpose, silicone adhesives that use silicone as the main material are attracting attention.

Silicone adhesives have excellent heat resistance, chemical resistance, and transparency. They exhibit adhesive strength to silicone rubber, fluororesin, metal, and the like, which are difficult to adhere to with general adhesives, and also have excellent re-adhesion properties.

Silicone adhesives are used in the form of a tape (film) as adhesive layers. In general, they are stored with one or both sides covered with mold release films before use, and then the mold release films are peeled off at the time of use.

As a mold release film used for this type of application, a silicone mold release film obtained by coating a silicone release agent on a substrate film is often used.

However, in such a silicone mold release film, when the silicone adhesive is coated, it tends to adhere strongly between the adhesive and the mold release film, making it difficult to peel off, since the chemical structures of the release agent and the adhesive are similar. For this reason, fluorine has been introduced into the silicone release agent for the purpose of lowering the peeling force (light peelability) to silicone adhesives. For example, Patent Document 1 proposes a fluorinated silicone material having a fluorine substituent in order to exhibit peelability with respect to silicone adhesives.

CITATION LIST

Patent Document

Patent Document 1: Japanese Patent Laid-Open No. 2011-201035

SUMMARY OF THE INVENTION

Problem to be Solved by the Invention

Silicone having a fluorine substituent (also referred to as "fluorinated silicone") as disclosed in Patent Document 1 is a substance having high chemical stability and low toxicity. However, since fluorinated silicone is expensive, there is a need to reduce the amount of fluorinated silicone used. In addition, the mold release film coated with the fluorinated silicone release agent is difficult to recycle, and thus it has also been desired to reduce the amount of fluorinated silicone used in this regard as well. Also, the durability of the mold release layer may become a problem.

Thus, the present invention relates to a silicone mold release film formed by using fluorinated silicone, and provides a novel mold release film that has light peelability with respect to a silicone adhesive layer while reducing the amount of fluorinated silicone used, as well as a film laminate formed by using the mold release film. It is also intended to provide a novel mold release film capable of increasing the durability of a mold release layer, and a film laminate formed by using the mold release film.

Means for Solving Problem

The present invention proposes a first mold release film comprising a mold release layer formed by curing a mold release layer composition containing a (A) curable silicone having a fluorine substituent, a (B) curable silicone having no fluorine substituent, and a (D) curing catalyst, on at least one side of a substrate film, wherein in a concentration distribution of fluorine atoms in the thickness direction within the mold release layer, fluorine atoms are unevenly distributed on the surface of the mold release layer, and the fluorine atom concentration on the surface of the mold release layer is 39.0 atom concentration% or more.

The present invention also proposes a second mold release film comprising a mold release layer formed by curing a mold release layer composition containing a (A) curable silicone having a fluorine substituent, a (B) curable silicone having no fluorine substituent, and a (D) curing catalyst, on at least one side of a substrate film,
wherein, when the concentration distribution of fluorine atoms in the thickness direction within the mold release layer is measured under a constant sputtering speed by using XPS (X-ray photoelectron spectroscopy) with GC-IB (gas cluster ion beam), and the obtained fluorine atom concentration distribution (vertical axis: fluorine atom concentration (atom %), horizontal axis: sputtering time (min)) is evenly divided into 9 sections by the total sputtering time to determine a first measurement point (sputtering time 0) and second to tenth measurement points, the fluorine atom concentration (atom %) at each of the second to tenth measurement points is 80.0% or less of the fluorine atom concentration (atom %) at the first measurement point (sputtering time 0), that is, 80.0% or less when the fluorine atom concentration (atom %) at the first measurement point (sputtering time 0) is set to 100.0%.

The present invention also proposes a third mold release film comprising a mold release layer formed by curing a mold release layer composition containing a (A) curable silicone having a fluorine substituent, a (B) curable silicone having no fluorine substituent, and a (D) curing catalyst, on at least one side of a substrate film,
wherein, when the concentration distribution of fluorine atoms in the thickness direction within the mold release layer is measured under a constant sputtering speed by using XPS (X-ray photoelectron spectroscopy) with GC-IB (gas cluster ion beam), and the obtained fluorine atom concentration distribution (vertical axis: fluorine atom concentration (atom %), horizontal axis: sputtering time (min)) is evenly divided into 9 sections by the total sputtering time to determine a first measurement point (sputtering time 0) and second to tenth measurement points, the average fluorine atom concentration (atom %) of the sixth to tenth measurement points is higher than 2.2% of the fluorine atom concentration (atom %) at the first measurement point (sputtering time 0), that is, higher than 2.2% when the fluorine atom concentration (atom %) at the first measurement point (sputtering time 0) is set to 100.0%.

The present invention also proposes a method for producing a mold release film including: mixing a (A) curable silicone having a fluorine substituent, a (C) silicone crosslinking agent, and a (D) curing catalyst, followed by stirring and/or leaving to stand the mixture (in the present invention, this treatment is also referred to as "pre-treatment"); mixing the mixture with a (B) curable silicone having no fluorine substituent to prepare a mold release layer composition; and coating the mold release layer composition on at least one side of a substrate film.

Effect of the Invention

The first and second mold release films proposed by the present invention, which relate to a mold release layer formed by using fluorinated silicone, have light peelability with respect to a silicone adhesive layer, yet reduce the amount of fluorinated silicone used, since fluorine is unevenly distributed on the surface of the mold release layer in the concentration distribution of fluorine atoms in the thickness direction within the mold release layer.

The third mold release film proposed by the present invention, which relates to a mold release layer formed by using fluorinated silicone, improves the durability of a mold release layer, since fluorine is present inside the mold release layer.

In accordance with the method for producing a mold release film proposed by the present invention, such mold release films can be suitably produced.

BRIEF DESCRIPTION OF DRAWINGS

FIG. 1 is a graph showing atomic concentration distributions (vertical axis: each atom concentration (atom %), horizontal axis: sputtering time (min)) of carbon (C), oxygen (O), silicon (Si), and fluorine (F) as XPS (X-ray photoelectron spectroscopy) measurement data obtained in Example 1.

FIG. 2 is a graph showing atomic concentration distributions (vertical axis: each atom concentration (atom %), horizontal axis: sputtering time (min)) of carbon (C), oxygen (O), silicon (Si), and fluorine (F) as XPS (X-ray photoelectron spectroscopy) measurement data obtained in Example 2.

FIG. 3 is a graph showing atomic concentration distributions (vertical axis: each atom concentration (atom %), horizontal axis: sputtering time (min)) of carbon (C), oxygen (O), silicon (Si), and fluorine (F) as XPS (X-ray photoelectron spectroscopy) measurement data obtained in Example 5.

FIG. 4 is a graph showing atomic concentration distributions (vertical axis: each atom concentration (atom %), horizontal axis: sputtering time (min)) of carbon (C), oxygen (O), silicon (Si), and fluorine (F) as XPS (X-ray photoelectron spectroscopy) measurement data obtained in Comparative Example 1.

FIG. 5 is a graph showing atomic concentration distributions (vertical axis: each atom concentration (atom %), horizontal axis: sputtering time (min)) of carbon (C), oxygen (O), silicon (Si), and fluorine (F) as XPS (X-ray photoelectron spectroscopy) measurement data obtained in Comparative Example 2.

FIG. 6 is a graph showing atomic concentration distributions (vertical axis: each atom concentration (atom %), horizontal axis: sputtering time (min)) of carbon (C), oxygen (O), silicon (Si), and fluorine (F) as XPS (X-ray photoelectron spectroscopy) measurement data obtained in Comparative Example 3.

MODE(S) FOR CARRYING OUT THE INVENTION

Next, the present invention will be described based on exemplary embodiments. The present invention is not limited to the embodiments that will be described below.

«Present Mold Release Film»

The mold release film according to an example of the embodiments of the present invention (referred to as "present mold release film") has a mold release layer (referred to as "present mold release layer) formed by curing a mold release layer composition (referred to as "present mold release layer composition") containing a (A) curable silicone having a fluorine substituent (also referred to as "fluorinated curable silicone"), a (B) curable silicone having no fluorine substituent (also referred to as "non-fluorinated curable silicone"), a (D) curing catalyst, and optionally a (C) silicone crosslinking agent, on one surface or both surfaces of a substrate film (referred to as "present substrate film").

<Present Mold Release Layer>

The present mold release layer is a layer obtained by curing the present mold release layer composition, and preferably contains fluorine unevenly distributed on the surface of the mold release layer in the concentration distribution of fluorine atoms in the thickness direction within the mold release layer.

This uneven distribution of fluorine on the surface of the mold release layer enables the mold release layer to achieve excellent light peelability that is easily peeled off from a silicone adhesive layer, and also reduces the amount of fluorinated silicone used.

In the present mold release layer, when the concentration distribution (ratio) of fluorine (F)atoms in the thickness direction within the mold release layer is measured under a constant sputtering speed by using XPS (X-ray photoelectron spectroscopy) with GC-IB (gas cluster ion beam), and the obtained fluorine atom concentration distribution (vertical axis: fluorine atom concentration (atom %), horizontal axis: sputtering time (min)) is evenly divided into 9 sections by the total sputtering time to determine a first measurement point (sputtering time 0) and second to tenth measurement points, the fluorine atom concentration (atom %, also referred to as atom concentration%) at the first measurement point (sputtering time 0), that is, on the surface of the mold release layer is 39.0% or more, preferably 39.5% or more, and even more preferably 40.0% or more. Meanwhile, the upper limit is not limited, but is generally 60.0% or less, and preferably 50.0% or less.

Also in the present mold release layer, when the fluorine atom concentration (atom %) at the first measurement point (sputtering time 0) is set to 100.0%, the fluorine atom concentration (atom %) at each of the second to tenth measurement points is preferably 80.0% or less of the fluorine atom concentration (atom %) at the first measurement point (sputtering time 0), more preferably 70.0% or less thereof, even more preferably 60.0% or less thereof, still more preferably 40.0% or less thereof, and particularly preferably 30% or less thereof. The lower limit is not particularly specified. However, it is generally more than 2.2%, preferably 3.0% or more, more preferably 4.0% or more, and even more preferably 5.0% or more.

Here, the sputtering time can be read as an index of the depth from the surface of the present mold release layer, since the sputtering time correlates with the depth from the surface of present the present mold release layer. In the present mold release layer, in order for fluorine to be unevenly distributed on the surface of the mold release layer as described above, for example, it is preferable to perform "pre-treatment" as described later to prepare the present mold release layer composition. However, it is not limited to such a method.

Further, when the fluorine atom concentration (atom %) at the first measurement point (sputtering time 0) is set to 100.0%, the average fluorine atom concentration (atom %) of the sixth to tenth measurement points is preferably more than 2.2% of the fluorine atom concentration (atom %) at the first measurement point (sputtering time 0), more preferably 3.0% or more thereof, even more preferably 4.0% or more thereof, and still more preferably 5.0% or more thereof. However, from the viewpoint of unevenly distributing fluorine on the surface of the mold release layer, it is preferably 30.0% or less thereof, more preferably 20.0% or less thereof, and even more preferably 10.0% or less thereof.

By performing the "pre-treatment" described later, more fluorine can be distributed even inside the present mold release layer (closer to the substrate) compared to the case where the pre-reaction is not performed. The detailed mechanism is not clear, but it is assumed that fluorine derived from intermediates (a state where single or multiple crosslinking agents are bonded to fluorinated silicone resins, but the crosslinking reaction between the fluorinated silicone resins has not been reached) and by-products, which are reaction products by the "pre-treatment", is distributed.

In order for fluorine to be unevenly distributed on the surface of the mold release layer and to be contained in a certain amount inside the present mold release layer as described above, it is preferable to perform the "pre-treatment" described later more sufficiently. However, it is not limited to such a method.

Since the sputtering time correlates with the depth from the surface of the present mold release layer as described above, the depth from the surface of the mold release layer may be used instead of the sputtering time to determine each of the above ratios. In the measurement of the fluorine atom concentration (atom %), when the distance between the surface of the mold release layer and the base layer, that is, the substrate film, is not exactly 9 sections due to film thickness fluctuation or the like during preparation of the measurement sample, the fluorine atom concentration (atom %) at each of the first to tenth measurement points may be calculated by performing conversion using another parameter and re-dividing into 9 sections.

The fluorine atom content in the present mold release layer is preferably 500 ppm by mass or more, more preferably 1,000 ppm by mass or more, and even more preferably 3,000 ppm by mass or more, from the viewpoint of obtaining stable and preferable light peelability with respect to silicone adhesives. Meanwhile, it is preferably 800,000 ppm by mass or less, more preferably 700,000 ppm by mass or less, even more preferably 500,000 ppm by mass or less, and still more preferably 300,000 ppm by mass or less, from the viewpoint of reducing the amount of fluorinated silicone used and reducing the fluorine atom content.

<Present Mold Release Layer Composition>

The present mold release layer composition contains a (A) curable silicone having a fluorine substituent, a (B) curable silicone having no fluorine substituent, a (D) curing catalyst, and optionally a (C) silicone crosslinking agent.

((A) Curable Silicone Having Fluorine Substituent)

The curable silicone having a fluorine substituent can impart stable light peelability with respect to silicone adhesives.

Here, the "silicone" refers to a polymer in which a siloxane bond (≡Si—O—Si≡) composed of silicon and oxygen is used as a skeleton, and an organic group mainly composed of methyl (–CH$_3$) is bonded to the silicon (Si).

The "curable silicone" refers to a silicone that can be cured by crosslinking reaction through heating or light irradiation (ultraviolet rays).

The "fluorine substituent" refers to a substituent containing fluorine atoms.

The substituent containing fluorine atoms (fluorine substituent) is not particularly limited as long as the substituent contains fluorine atoms. Specific examples thereof include a fluorine group, a trifluoromethyl group, a pentafluoroethyl group, a 2,2-trifluoroethyl group, a 1H,1H-heptafluorobutyl group, a 2H-hexafluoroisopropyl group, a perfluoro-t-butyl group, and a perfluorohexyl group. However, it is not limited to these.

Examples of the component having a fluorine substituent include a resin containing a fluorine substituent in the side chain portion of the resin skeleton. Specific examples of the curable silicone having a fluorine substituent include KP-911, X-70-2015, and X-41-3035, manufactured by Shin-Etsu Chemical Co., Ltd.; and FS1265-30005, FS1265-1000CS, FS1265-10000CS, BY24-900, BY24-903, 3062, Q2-7785, SYL-OFF 7792, and SYL-OFF 7795, manufactured by Toray Dow Corning Co., Ltd. However, it is not limited to these.

The curable silicone having a fluorine substituent may be a solvent-type, a solvent-free-type, or a mixture of these.

The curable silicone having a fluorine substituent may be used alone, or in a mixture of two or more types thereof.

Here, the "solvent-free-type curable silicone" is a silicone having a viscosity capable of being coated without being diluted with a solvent, and refers to a silicone having a short polysiloxane chain and a relatively low molecular weight.

The viscosity of the solvent-free-type curable silicone, when used alone, is preferably 1,000 mPa·s or less, more preferably 50 mPa·s or more or 900 mPa·s or less, and even more preferably 80 mPa·s or more or 800 mPa·s or less. This point also applies to the (B) curable silicone having no fluorine substituent.

Meanwhile, the "solvent-type curable silicone" is a silicone having a high viscosity not capable of being coated unless being diluted with a solvent, and refers to a silicone having a relatively high molecular weight. This point also applies to the "(B) curable silicone having no fluorine substituent".

The viscosity of the solvent-type curable silicone, when formed into a 30% toluene solution, is preferably 1,000 mPa·s or more, more preferably 2,000 mPa·s or more or 20,000 mPa·s or less, and even more preferably 3,000 mPa·s or more or 18,000 mPa·s or less. The high viscosity of the solvent-type curable silicone tends to increase the adhesion to the substrate film. This point also applies to the (B) curable silicone having no fluorine substituent.

The fluorine atom content (atomic number fraction) of the curable silicone having a fluorine substituent is generally several thousand ppm (less than 1% of the total number of atoms in the "curable silicone having a fluorine substituent") to several hundred thousand ppm (several tens of percent of the total number of atoms in the "curable silicone having a fluorine substituent").

((B) Curable Silicone Having No Fluorine Substituent)

The curable silicone having no fluorine substituent may be a solvent-type, a solvent-free-type, or a mixture of these. Among them, the (B) curable silicone having no fluorine substituent is preferably a solvent-type curable silicone, from the viewpoint of stably obtaining light peelability with respect to silicone adhesives.

Specific examples of the curable silicone having no fluorine substituent include KNS-3051, KNS-320A, KNS-316, KNS-3002, KNS-3300, X-62-1387, KS-837, X-62-2829, KS-3650, KS-847, KS-847T, KS-776L, KS-776A, KS-774, KS-3703T, KS-3601, KS-830E, X-62-2825, X-62-9201-A, X-62-9201B, KM3951, KM-768, X-52-6015, KF-2005, X-62-7205, X-62-7028-A, X-62-7028-B, X-62-7052, X-62-7622, X-62-7660, and X-62-7655, manufactured by Shin-Etsu Chemical Co., Ltd.; and SP7017, SP7015, SP7025, SP7031, LTC1006L, LTC1063L, LTC1036M, LTC1056L, SRX357, SRX211, SRX345, SRX370, LTC300B, LTC310, LTC355A, LTC759, LTC755, LTC750A, LTC752, LTC761, LTC856, and LTC851, manufactured by Toray Dow Corning Co., Ltd. However, it is not limited to these.

The above-mentioned non-fluorinated curable silicone may also be added with a heavy peeling additive, and examples thereof include KS-3800 manufactured by Shin-Etsu Chemical Co., Ltd.; and SD7292 and BY24-4980, manufactured by Toray Dow Corning Co., Ltd.

The non-fluorinated curable silicone may be used alone, or in a mixture of two or more types having different reactive functional groups and viscosities.

By mixing two or more types of non-fluorinated curable silicones, the curing reaction can be adjusted, the viscosity of the coating liquid can be adjusted, and the wettability and reactivity can be enhanced. In so doing, the solvent-free-type silicones may be mixed with each other, the solvent-type silicones may be mixed with each other, or the solvent-free-type silicone may be mixed with the solvent-type silicone. In particular, when the film thickness is increased in order to obtain a mold release film that can be more lightly peeled off, the solid content concentration of the coating liquid forming a curing layer tends to be high. This may cause the viscosity of the coating liquid to increase, resulting in deterioration of the coating appearance and large thickness unevenness. Thus, by mixing the solvent-free-type silicone and the solvent-type silicone, the viscosity of the coating liquid can be lowered to form a curing layer having good coating appearance and small thickness unevenness.

The solvent-type curable silicone and the solvent-free-type curable silicone are as described above, and the respective preferred viscosity ranges are also the same as those described above.

(Ratio of (A) to (B))

In the present mold release layer composition, the mass ratio of the (A) curable silicone having a fluorine substituent to the (B) curable silicone having no fluorine substituent is preferably 1:50 to 10:1, more preferably 1:20 to 5:1, even more preferably 1:10 to 2:1, and still more preferably 1:5 to 1:1.

As described above, in the present invention, the use of a curable silicone that is cured by hydrosilylation addition reaction is preferable especially for the "(A) curable silicone having a fluorine substituent", from the viewpoint of availability of materials.

On the other hand, in producing the "mold release film characterized in that the concentration of fluorine atoms on the surface of the mold release layer is higher than that inside the mold release layer in the concentration distribution of fluorine atoms in the thickness direction within the mold release layer", which is a characteristic of the present invention, a curable silicone such as condensation-type or UV curable-type may be used since there is no particular limitation on the curing method.

((C) Silicone Crosslinking Agent)

The "crosslinking agent" is a compound that links polymers to each other, for example, a compound that can link two or more molecules by chemical covalent bonding.

Examples of the silicone crosslinking agent include a (C1) silicone crosslinking agent having no fluorine substituent (also referred to as "fluorinated silicone crosslinking agent") and a (C2) silicone crosslinking agent having a fluorine substituent (also referred to as "non-fluorinated silicone crosslinking agent").

Among them, it is preferable to use a (C1) non-fluorinated silicone crosslinking agent, from the viewpoint of ensuring the effect of the pre-reaction, which will be described later, and the effects of increasing the uneven distribution of fluorine, that is, increasing the light peelability and increasing the residual adhesion rate. When both are mixed and used, it is preferable that the amount of (C1) is larger than that of the other.

((C1) Silicone Crosslinking Agent Having No Fluorine Substituent)

The "(C1) silicone crosslinking agent having no fluorine substituent" is represented by the following general formula (1), and has at least 2, preferably 3 or more (usually 3 to 200), more preferably 3 to 100, and particularly preferably 3 to 50 silicon atom-bonded hydrogen atoms (SiH groups) in one molecule.

$$R_bH_cSiO_{(4-b-c)/2} \quad (1)$$

In the formula (1), R is an unsubstituted or substituted univalent hydrocarbon group having 1 to 10 carbon atoms. Further, b is 0.7 to 2.1, particularly 0.8 to 2.0; c is 0.001 to 1.0; and b+c is a positive number satisfying 0.8 to 3.0, particularly 1.0 to 2.5.

Here, R includes the same group as R in the alkenyl group-containing organopolysiloxane, but preferably one having no aliphatic unsaturated bonding such as an alkenyl group.

This silicon atom-bonded hydrogen atoms may be bonded to silicon atoms at the end of the molecular chain, or to silicon atoms in the middle of the molecular chain (non-terminal end of the molecular chain), or to both of these.

The molecular structure of the "(C1) silicone crosslinking agent having no fluorine substituent" may be any of a linear, cyclic, branched, or three-dimensional network structure.

Further, the number of silicon atoms (or degree of polymerization) in one molecule is preferably 2 to 1,000, more preferably 3 or more or 500 or less, even more preferably 3 or more or 300 or less, and particularly preferably 4 or more or 150 or less.

Examples of the "(C1) silicone crosslinking agent having no fluorine substituent" include tris(dimethylhydrogensiloxy)methylsilane, tris(dimethylhydrogenciloxy)phenylsilane, 1,1,3,3-tetramethyldisiloxane, 1,3,5,7-tetramethylcyclotetrasiloxane, methylhydrogencyclo polysiloxane, methylhydrogensiloxane/dimethylsiloxane cyclic copolymer, both-terminal trimethylsiloxy group-blocked methylhydrogenpolysiloxane, both-terminal trimethylsiloxy group-blocked dimethylsiloxane/methylhydrogensiloxane copolymer, both-terminal dimethylhydrogensiloxy group-blocked dimethylpolysiloxane, both-terminal dimethylhydrogensiloxy group-blocked methylhydrogenpolysiloxane, both-terminal dimethylhydrogensiloxy group-blocked dimethylsiloxane/methylhydrogensiloxane copolymer, both-terminal trimethylsiloxy group-blocked methylhydrogensiloxane/diphenylsiloxane copolymer, both-terminal trimethylsiloxy group-blocked methylhydrogensiloxane/diphenylsiloxane/dimethylsiloxane copolymer, copolymer composed of $(CH_3)_2HSiO_{1/2}$ unit and $SiO_{4/2}$ unit, copolymer composed of $(CH_3)_2HSiO_{1/2}$ unit, $SiO_{4/2}$ unit, and $(C_6H_5)SiO_{3/2}$ unit, and those in which a part or all of the methyl group is substituted with another alkyl group such as an ethyl group or a propyl group, or an aryl group such as a phenyl group in these exemplary compounds. However, it is not limited to these.

It is preferable to use two or more types of crosslinking agents in combination.

The purpose of the combined use is also to expect the action of progressing the crosslinking reaction.

The content of the "(C1) silicone crosslinking agent having no fluorine substituent" (the total amount when a plurality of types are used) is preferably 0.1 to 50 parts by mass, more preferably 0.3 part by mass or more or 30 parts by mass or less, and even more preferably 0.5 part by mass or more or 20 parts by mass or less, relative to 100 parts by mass of the curable silicones ((A) +(B)).

The molar ratio of the silicon atom-bonded hydrogen atoms (SiH groups) in the (C) silicone crosslinking agent to the total amount of the silicon atom-bonded alkenyl groups in the (A) curable silicone having a fluorine substituent and the silicon atom-bonded alkenyl groups in the (B) curable silicone having no fluorine substituent is preferably 0.3 to 3.0, more preferably 0.5 or more or 2.5 or less, and even more preferably 0.8 or more or 2.0 or less.

Specific examples of the "(C1) silicone crosslinking agent having no fluorine substituent" include 3062A, 3062B, 3062D, and SP7297, manufactured by Toray Dow Corning Co., Ltd.

((C2) Silicone Crosslinking Agent Having Fluorine Substituent)

Examples of the (C2) silicone crosslinking agent having a fluorine substituent include those in which R has a fluoro group in the formula (1).

Specific examples thereof include 3062C and Q2-7560, manufactured by Toray Dow Corning Co., Ltd.

((D) Curing Catalyst)

The "curing catalyst" is a catalyst that promotes the hydrosilylation addition reaction between the alkenyl groups bonded to the silicon atoms in the curable silicone and the hydrogensilane (SiH) groups of the (C) silicone crosslinking agent.

Examples of the curing catalyst include platinum black, secondary platinum chloride, platinum chloride acid, reactant of platinum chloride acid with univalent alcohol, complex of platinum chloride acid and olefins, platinum-based catalyst such as platinum bisacetacetate, palladium-based catalyst, and platinum group metal-based catalyst such as rhodium-based catalyst. However, it is not limited to these.

The content of the curing catalyst in the present mold release layer composition or the present mold release layer is preferably 0.5 to 500 ppm by mass, more preferably 5 ppm by mass or more or 500 ppm by mass or less, and even more preferably 10 ppm by mass or more or 200 ppm by mass or less in terms of metal equivalent amount, relative to the total amount ((A) +(B)) of the curable silicones.

((E) Reaction Control Agent)

The present mold release layer composition and the present mold release layer may optionally contain a reaction control agent in addition to the above components.

As the (E) reaction control agent, acetylene alcohol or the like represented by the following general formula (2) can be used.

$$CH \equiv C - C(R_2)(OH)R_1 \qquad (2)$$

In the formula (2), $R_1$ is a linear or branched univalent hydrocarbon group having 5 to 15 carbon atoms, and $R_2$ is a linear univalent hydrocarbon group having 1 to 3 carbon atoms.

In the formula (2), $R_1$ is preferably a linear or branched univalent hydrocarbon group having 5 to 15 carbon atoms, more preferably 6 to 14 carbon atoms, and particularly preferably 8 to 12 carbon atoms.

Specific examples of $R_1$ include alkyl groups such as a pentyl group, a neopentyl group, a hexyl group, a heptyl group, an octyl group, a nonyl group, a decyl group, an undecyl group, and a dodecyl group; and alkenyl groups such as a penthenyl group, a hexenyl group, and a heptenyl group. However, it is not limited to these.

When the number of carbon atoms in the univalent hydrocarbon group of $R_1$ is less than 5 in the formula (2), the volatility of the control agent may be high and the control effect may be insufficient. Meanwhile, when the number of carbon atoms is more than 15, the effective component of acetylene alcohol per mol decreases and the control effect tends to be weakened, and thus there are concerns such as the need to add a large amount thereof in order to obtain a desired control effect.

In the formula (2), $R_2$ is a linear univalent hydrocarbon group having 1 to 3 carbon atoms, preferably 1 to 2 carbon atoms. Specific examples of $R_2$ include alkyl groups such as a methyl group, an ethyl group, and an n-propyl group; and alkenyl groups such as a vinyl group, an allyl group, and an n-propenyl group. However, it is not limited to these. The smaller the number of carbon atoms in $R_2$, the easier it is to control the silicone composition, and thus a methyl group is preferred.

The reaction control agent may be used alone, or may be used in combination of two or more types thereof, as necessary.

The content of the reaction control agent is preferably 0.001 to 5.0 parts by mass, more preferably 0.01 part by mass or more or 1.0 part by mass or less, and even more preferably 0.05 part by mass or more or 0.5 part by mass or less, relative to 100 parts by mass of the total amount of the present mold release layer composition.

(Other Components)

The present mold release layer composition and the present mold release layer may contain other components in addition to the above components, as necessary. Examples of the other components include resins such as silicone other than the curable silicone, silicone rubber, silicone resin, polyolefin resin, acrylic resin, urethane resin, epoxy resin, alkyd resin, and cellulose; copolymers of these resins modified by graft polymerization; various particles such as silica particles, alumina particles, silicone rubber particles, silicone resin particles, and silicone rubber-resin composite particles; and silane coupling agents. However, it is not limited to these.

The present mold release layer composition and the present mold release layer may contain, for example, a light peeling agent, a heavy peeling agent, a crosslinking agent, and an adhesion improver, as necessary.

Specific examples of the light peeling agent, the heavy peeling agent, and the adhesion improver include KS-3800 and X-92-185, manufactured by Shin-Etsu Chemical Co., Ltd.; and BY24-850, SD7292, BY24-4980, SP7297, BY24-808, and SD7200, manufactured by Toray Dow Corning Co., Ltd. However, it is not limited to these.

(Solid Content)

The solid content concentration of the present mold release layer composition is preferably 0.1% by mass to 100% by mass, more preferably 0.5% by mass or more or 50% by mass or less, even more preferably 1.0% by mass or more or 20% by mass or less, and still more preferably 1.5% by mass or more or 10% by mass or less.

The solid content of the present mold release layer composition includes alkyl vinyl polysiloxane and alkyl hydrogen polysiloxane. The preferred amount of alkyl vinyl polysiloxane containing vinyl groups (alkenyl groups) is 85.0% by mass to 99.9% by mass, preferably 90.0% by mass or more or 99.5% by mass or less, and more preferably 92.0% by mass or more or 99.0% by mass or less per solid content mass.

(Film Thickness of Present Mold Release Layer)

The film thickness of the present mold release layer is not particularly limited. When the film thickness of the mold release layer is thick, it is preferable that the influence of the substrate, for example, the influence of the hardness of the substrate is difficult to be transmitted to the mold release surface of the present mold release film. Therefore, the film thickness is preferably 0.01 µm or more, more preferably 0.05 µm or more, and even more preferably 0.10 µm or more. Meanwhile, when the film thickness of the present mold release layer is too thick, blocking may occur and the appearance of coating may be deteriorated. Therefore, the film thickness is preferably 10 µm or less, more preferably 5 µm or less, even more preferably 1 µm or less, still more preferably 0.5 µm or less, and particularly preferably 0.25 µm or less.

<Present Substrate Film>

The material of the present substrate film is not particularly limited as long as it has a film shape. For example, it may be made of paper, resin, metal, or the like. Among these, it is preferably made of resin from the viewpoint of mechanical strength and flexibility.

Examples of the substrate film made of resin include a film obtained by forming a polymer, such as polyethylene, polypropylene, polyester, polystyrene, polycarbonate, polyether sulfone, polyamide, or polyimide, into a film shape. However, it is not limited to these. It can also be a mixture of these materials (polymer blend) or a composite of the constituting units (copolymer), as long as it can be formed into a film shape.

Among the films exemplified above, a polyester film is particularly preferred since it has excellent physical properties such as heat resistance, flatness, optical properties, and strength.

The polyester film may be a single layer or a multilayer film (laminated film) having two or more layers with different properties.

The polyester film may be an unstretched film (sheet) or a stretched film. Among them, a stretched film that is stretched in the uniaxial direction or the biaxial directions is preferred. Among them, a biaxially stretched film is more preferred from the viewpoint of balance of mechanical properties and flatness.

The polyester, which is the main component resin of the polyester film, may be a homopolyester or a copolymerized polyester.

Here, the main component resin means a resin having the largest mass ratio among the resins constituting the present polyester film, and is assumed to occupy 50% by mass or more, 75% by mass or more, 90% by mass or more, or 100% by mass of the resins constituting the present polyester film.

The homopolyester is preferably obtained by polycondensing an aromatic dicarboxylic acid and an aliphatic glycol. Examples of the aromatic dicarboxylic acid include terephthalic acid and 2,6-naphthalenedicarboxylic acid, and examples of the aliphatic glycol include ethylene glycol, diethylene glycol, 1,4-butanediol, and 1,4-cyclohexanedimethanol. However, it is not limited to these.

Typical examples of the homopolyester include polyethylene terephthalate (PET) and polybutylene terephthalate (PBT).

Meanwhile, when the polyester is a copolymerized polyester, it is preferably a copolymer containing a third component in 30 mol % or less.

Examples of the dicarboxylic acid component of the copolymerized polyester include one or two or more types of isophthalic acid, phthalic acid, terephthalic acid, 2,6-naphthalenedicarboxylic acid, adipic acid, and sebacic acid; and examples of the glycol component thereof include one or two or more types of ethylene glycol, diethylene glycol, propylene glycol, 1,4-butanediol, 1,4-cyclohexanedimethanol, and neopentyl glycol. However, it is not limited to these.

Among them, as the main component resin of the present substrate film, it is preferably polyethylene terephthalate having an ethylene terephthalate unit in 60 mol % or more, preferably in 80 mol % or more.

The present substrate film may also contain particles for the main purpose of imparting slipperiness and preventing scratches in each production process. When containing particles, the type of particles to be contained is not particularly limited as long as the particles are capable of imparting slipperiness; and specific examples thereof include inorganic particles such as silica, calcium carbonate, magnesium carbonate, barium carbonate, calcium sulfate, calcium phosphate, magnesium phosphate, kaolin, aluminum oxide, and titanium oxide, and organic particles such as acrylic resin, styrene resin, urea resin, phenol resin, epoxy resin, and benzoguanamine resin. However, it is not limited to these. In addition, precipitated particles in which a part of a metal compound such as a catalyst is precipitated and finely dispersed can also be used during the polyester production process.

The shape of the particles to be used is not particularly limited, and may be any of spherical shape, aggregated shape, rod shape, flat shape, or the like. Further, the hardness, specific gravity, color, and the like are not particularly limited. Two or more types of these series of particles may be used in combination, as necessary.

The average particle diameter of the particles is preferably 5 µm or less, and more preferably in a range of 0.1 µm or more or 3 µm or less. By using particles having an average particle diameter in the above range, an appropriate surface roughness can be given to the film, and good slipperiness and smoothness can be ensured.

The average particle diameter of the particles can be measured as follows.

The average particle diameter of the particles serving as raw materials can be measured as the average particle diameter (D50) obtained from the volume-based particle size distribution measured by a dynamic light scattering method or the like.

The average particle diameter of the particles in the state of being contained in the present substrate film can be determined as the average value of the diameters of 10 or more particles measured by observing the surface or cross-section of the present substrate film using an optical microscope or a scanning electron microscope (SEM). In this case, when the cross-sectional shape is elliptical, the measurement can be performed by defining the average value of the longest diameter and the shortest diameter as the diameter of each particle.

The particle content in the present substrate film is preferably 5% by mass or less, and more preferably in a range of 0.0003% by mass or more or 3% by mass or less. When there are no or few particles, the film becomes a highly transparent and good film, but the slipperiness may be insufficient. Therefore, measures such as improving the slipperiness by adding particles in the coating layer may be required. Meanwhile, when the particle content is too high, the transparency of the film may be insufficient.

<Examples of Present Mold Release Film Structure>

The present mold release film may have a structure in which the present mold release layer is provided on one side or both sides of the present substrate film, and thus the present substrate film and the present mold release layer may be directly laminated or may be laminated via other layers, on one side or both sides of the present mold release film, as described below.

Examples of the "other layers" include an anchor coat layer for enhancing the adhesion between the present substrate film and the present mold release layer, an oligomer sealing layer for sealing exudation (bleeding, plate-out) of compounds or oligomer onto the film surface, and an antistatic layer having antistatic properties. However, it is not limited to these.

Specific examples of the structure of the present mold release film include structures composed of: present substrate film/present mold release layer; present substrate film/anchor coat layer/present mold release layer; present substrate film/antistatic layer/present mold release layer; present substrate film/oligomer sealing layer/present mold release layer; antistatic layer/present substrate film/antistatic layer/present mold release layer; oligomer sealing layer/present substrate film/oligomer sealing layer/present mold release layer; present substrate film/antistatic layer/oligomer sealing layer/present mold release layer; present mold release layer/present substrate film/present mold release layer; present mold release layer/anchor coat layer/present substrate film/anchor coat layer/present mold release layer; present mold release layer/antistatic layer/present substrate film/antistatic layer/present mold release layer; present mold release layer/oligomer sealing layer/present substrate film/oligomer sealing layer/present mold release layer; and present mold release layer/oligomer sealing layer/antistatic layer/present substrate film/antistatic layer/oligomer sealing layer/present mold release layer. However, it is not limited to these.

(Anchor Coat Layer)

Examples of the anchor coat layer include those containing a polymer material such as polyethylene, polypropylene, styrene-based copolymers, polyester, polyurethane, polyvinyl alcohol, polyethyleneimine, polyacrylate, polymethacrylate, and modified products thereof. However, it is not limited to these.

(Oligomer Sealing Layer)

The oligomer sealing layer may contain hydrolyzable alkoxysilicate and/or polycondensation products thereof. Examples of the hydrolyzable alkoxysilicate include those having a structure represented by the following general formula (3) ($R_1$ represents a hydrocarbon group having 1 to 10 carbon atoms).

$$Si(OR^1)_4 \qquad (3)$$

In the formula (3), $R^1$ represents a hydrocarbon group having 1 to 10 carbon atoms. The oligomer sealing layer may further contain inorganic particles, and specific examples of the inorganic particles include silica, alumina, kaolin, calcium carbonate, titanium oxide, and barium salt. However, it is not limited to these.

The oligomer sealing layer may also contain an antifoaming agent, a coatability improving agent, a thickener, an organic lubricant, organic polymer particles, an antioxidant, an ultraviolet absorber, a foaming agent, a dye, and the like. However, it is not limited to these.

(Antistatic Layer)

The antistatic layer preferably contains a conductive polymer and a binder polymer from the viewpoint of imparting antistatic properties.

The coating liquid may contain other components as long as the gist of the present invention is not impaired.

The conductive polymer preferably contains polythiophene and its derivative (I), as specifically represented by the following formula (4).

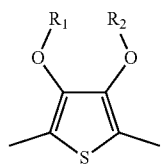

Formula (4)

In the formula (4), $R_1$ and $R_2$ each independently represent a hydrogen element, an aliphatic hydrocarbon group having 1 to 12 carbon atoms, an alicyclic hydrocarbon group, or an aromatic hydrocarbon group, such as a methyl group, an ethyl group, a propyl group, an isopropyl group, a butyl group, a cyclohexylene group, or a benzene group. However, it is not limited to these.

The above-mentioned layers such as the anchor coat layer, the antistatic layer, and the oligomer sealing layer can be formed either by an in-line coating method in which the layers are formed at the same time as the film-shaped substrate is formed, or by an off-line coating method in which the layers are formed in a separate process on the substrate film that has been film-formed. Specific examples of the in-line coating method include a method of coating at an arbitrary stage from melt extrusion of polyester to heat fixing and winding after biaxial stretching. Usually, the method is to coat on any of an unstretched sheet in a substantially amorphous state obtained by melting and quenching, an uniaxially stretched film that is stretched in the longitudinal (vertical) direction afterward, or a biaxially stretched film before heat fixing.

«Method for Producing Present Mold Release Film»

Next, an example of the method for producing the present mold release film will be described.

To reduce the amount of silicone having a fluorine substituent (fluorinated silicone) used in the mold release film, it can be generally considered that, for example, the ratio of the fluorinated silicone contained in the mold release film is reduced, or the film thickness of the mold release layer is decreased. However, the former method may impair the light peelability, which is the original purpose of the present invention, and the latter method may have problems such as not being able to form the mold release layer uniformly or decreasing the stability of the peeling force.

Alternatively, by using a combination of the (A) curable silicone having a fluorine substituent (also referred to as "fluorinated curable silicone") and the (B) curable silicone having no fluorine substituent (also referred to as "non-fluorinated curable silicone"), it is conceivable to reduce the amount of fluorinated silicone used while maintaining the light peelability.

However, when a solution obtained by mixing the (A) fluorinated curable silicone and the (B) non-fluorinated curable silicone is applied and dried on the film, it has been confirmed that the (A) fluorinated curable silicone, which is more hydrophobic, tends to segregate on the surface (air interface) side. On the other hand, the silicone crosslinking agent and catalyst used in combination do not have the same level of high hydrophobicity as the (A) fluorinated curable silicone due to their molecular structure, and thus some problems have been confirmed, such as not uniformly dispersed in the film and not being able to obtain a mold release layer having a good cured state, and not being able to mix a large amount of the (B) non-fluorinated curable silicone.

In the present invention, in forming the mold release layer, the mold release layer composition is prepared by firstly mixing the (A) curable silicone having a fluorine substituent, the (C) silicone crosslinking agent, and the (D) curing catalyst, followed by subjecting to a process of reacting the mixture by stirring and/or leaving to stand, that is, a "pre-treatment, and then mixing the mixture with the (B) curable silicone having no fluorine substituent. By doing so, even when the (C1) silicone crosslinking agent having no fluorine substituent is used as the (C) silicone crosslinking agent, the material can be uniformly dispersed, and a coating film that is easily peeled off (light peelability) from the silicone adhesive can be formed.

In other words, an example of a preferred method for producing the present mold release film includes, for example, an method of: mixing the (A) fluorinated curable silicone, the (C) silicone crosslinking agent, and the (D) curing catalyst, followed by subjecting to a "pre-treatment" of stirring and/or leaving to stand the mixture; then mixing the pre-treated composition obtained in the pre-treatment with the (B) non-fluorinated curable silicone to prepare the present mold release layer composition; and coating the present mold release layer composition on at least one surface of the present substrate film to produce the present mold release film. However, the present invention is not limited to this production method.

By mixing the (A) fluorinated curable silicone, the (C) silicone crosslinking agent, and the (D) curing catalyst, followed by subjecting to the "pre-treatment" of stirring and/or leaving to stand the mixture for a while, the crosslinking reaction (also referred to as "pre-crosslinking") can be advanced in the mixed solution under room temperature.

In this case, the "stirring and/or leaving to stand", that is, the "pre-treatment" may be performed by any other means as long as the crosslinking reaction can be advanced, and the duration of the process is preferably 10 seconds or longer, more preferably 1 minute or longer, even more preferably 3 minutes or longer, still more preferably 5 minutes or longer, and particularly preferably 15 minutes or longer. The upper limit of the duration of the pre-treatment is not particularly limited. It is preferably within 1 week, more preferably within 3 days, and particularly preferably within 1 day, from the viewpoint of solvent volatilization and workability.

When the crosslinking reaction is too advanced, the liquid may become cloudy or gelled depending on the type of the material. Therefore, it is preferable to blend (or add) a reaction control agent (inhibitor) (such as an acetylene alcohol derivative) after a lapse of a predetermined pre-crosslinking time. The reaction control agent may be blended to a non-fluorinated curable silicone (or a blended solution thereof) described later.

As the (C) silicone crosslinking agent, it is preferable to use a silicone crosslinking agent having no fluorine substituent, as described above.

It is preferable that the pre-treatment composition obtained by the above-mentioned pre-treatment is mixed with the (B) non-fluorinated curable silicone, and then the mixture is diluted with a solvent, as necessary, to prepare the present mold release layer composition.

The solvent for dilution may be a polar solvent or a non-polar solvent. Further, two or more types of the above solvents may also be used in a mixture.

Examples of the polar solvent include alcohols such as ethanol and (iso)propyl alcohol; esters such as methyl acetate, ethyl acetate, (iso)propyl acetate, (iso)butyl acetate, (iso)pentyl acetate, ethyl lactate, and ethyl benzoate; ketones such as methyl ethyl ketone, methyl isobutyl ketone, cyclopentanone, cyclohexanone, diacetone alcohol, and diisobutyl ketone; glycols such as ethylene glycol, ethylene glycol monoethyl ether, ethylene glycol monobutyl ether, propylene glycol monomethyl ether acetate, and propylene glycol monomethyl ether; N-methyl-2-pyrrolidone; N,N-dimethylformamide; tetrahydrofuran; and acetonitrile. However, it is not limited to these.

Examples of the non-polar solvent include aromatic hydrocarbons such as benzene, toluene, and xylene; aliphatic hydrocarbons such as hexane, heptane, and octane; hydrocarbons having a branched structure such as isohexane, isooctane, and isononane; alicyclic hydrocarbons such as cyclohexane, cycloheptane, and cyclooctane; ethers such as diisopropyl ether; and dioxane. Examples of the fluorine solvent include hydrofluoroethers, metaxylene hexafluoride, and tridecafluorooctane. However, it is not limited to these.

As the method for coating the present mold release layer composition on the present substrate film, for example, a coating technique as described in "Coating Houhou" ("Coating Method") written by Yuji Harasaki and published by Maki-shoten (1979) can be adopted. Examples of the coating method include by using an air doctor coater, a blade coater, a rod coater, a knife coater, a squeeze coater, an impregnation coater, a reverse roll coater, a transfer roll coater, a gravure coater, a kiss roll coater, a cast coater, a spray coater, a curtain coater, a calender coater, and an extrusion coater. However, it is not limited to these.

(Method for Forming Other Layers)

As described above, the present mold release film can be formed by forming "other layers" such as an anchor coat layer, an antistatic layer, and an oligomer sealing layer, as necessary, on one or both surfaces of the substrate film, and then coating and curing the mold release layer composition.

When forming "other layers" as described above, the "other layers" such as an anchor coat layer, an antistatic layer, and an oligomer sealing layer are formed, as necessary, on at least one surface of the substrate film unwound from the rolled state, and the mold release layer composition is coated and cured to form a mold release layer.

<Physical Properties of Present Mold Release Film>

The present mold release film can be provided with the following physical properties.

(Normal-State Peeling Force)

The normal-state peeling force of the present mold release layer is preferably 75 mN/cm or less, more preferably 60 mN/cm or less, even more preferably 50 mN/cm or less, and particularly preferably 40 mN/cm or less. The lower the normal-state peeling force, the smaller the force required for peeling from the silicone adhesive, and defects such as peeling failure and adhesive layer deformation in the production process can be thus suppressed. Also, in a double-sided adhesive tape having release films on both sides of the adhesive sheet, the use of the mold release film having excellent light peelability enables a phenomenon of the release film peeling on the unintended side to be prevented.

The lower limit thereof is not particularly limited. It is preferably 1 mN/cm or more from the viewpoint of long-term storage of a laminated body in which the release film and the adhesive are laminated.

The normal-state peeling force can be determined by bonding an adhesive tape "silicone adhesive-equipped polyimide tape No. 5413 (manufactured by 3M)" to the present mold release layer at a width of 5 cm, and measuring the peeling force using a peeling tester under the conditions of 180° peeling and 0.3 m/min peeling speed in an environment of room temperature, that is, at 23° C.

(Heat Peeling Force)

The heat peeling force of the present mold release layer is preferably 100 mN/cm or less, more preferably 80 mN/cm or less, and particularly preferably 60 mN/cm or less.

The heat peeling force is considered to be correlated with the reactive groups (such as hydrogensilane groups (Si-H groups)) that remain on the surface of the mold release layer after curing and forming on the film. The closer the heat peeling force is to the normal-state peeling force, the smaller the amount of reactive groups remaining on the surface.

The heat peeling force can be determined by bonding an adhesive tape "silicone adhesive-equipped polyimide tape No. 5413 (manufactured by 3M)" to the present mold release layer, cutting the tape into a size of 50 mm×300 mm, heat-treating the sample at 100° C. for 1 hour in a hot air oven, followed by taking out the sample therefrom, leaving the sample at room temperature for 1 hour, and measuring the peeling force. In this case, the peeling force can be measured using, for example, "EZ Graph" manufactured by Shimadzu Corp. under the conditions of 180° peeling and 0.3 (m/min) peeling speed.

(Residual Adhesion Rate)

The residual adhesion rate of the present mold release layer is preferably 80% or more, more preferably 90% or more, and even more preferably 95% or more.

Satisfying the above range reduces the transfer of the mold release layer component from the surface of the mold release layer to the surface of the other adherend to be bonded.

Here, the residual adhesion rate refers to an index for confirming the transfer of the release agent, and is usually expressed as a ratio obtained by dividing the adhesive force of an adhesive tape that is applied to a release agent-coated surface or the like and then peeled off, by the initial adhesive strength, in an environment of room temperature, that is, at 23° C. (JIS Z0109:2015).

«Present Film Laminate»

The film laminate according to one example of the embodiment of the present invention (referred to as "present film laminate") includes a film laminate having a configuration in which the above-mentioned present mold release film is bonded to a "laminated film having a functional layer" via a silicone adhesive layer.

<Laminated Film (1)>

Examples of the "laminated film having a functional layer" include a laminated film having a crosslinking resin layer, that is, a layer having a structure in which the resin is crosslinked, provided on at least one side of a substrate film (referred to as "laminated film (1)").

Examples of the crosslinking resin layer include those formed from a crosslinking resin layer composition containing a conductive polymer and a binder polymer, and optionally a crosslinking agent and particles.

(Conductive Polymer)

The conductive polymer preferably contains a composition composed of polythiophene and a polyanion, or a composition composed of the polythiophene derivative and a polyanion.

The polyanion refers to an "acidic polymer in a free acid state", and is preferably a polymer carboxylic acid, a polymer sulfonic acid, a polyvinyl sulfonic acid, or the like. Specific examples of the polymer carboxylic acid include a polyacrylic acid, a polymethacrylic acid, and a polymaleic acid. Specific examples of the polymer sulfonic acid include a polystyrene sulfonic acid. Among them, a polystyrene sulfonic acid is most preferred in terms of conductivity. In addition, it may use a salt form in which a part of the free acid is neutralized. It can be considered that by using these polyanions during polymerization, the polythiophene compound, which is originally insoluble in water, can be easily dispersed in water or made water-based, and its function as an acid also serves as a doping agent for the polythiophene compound.

The polymer carboxylic acid and the polymer sulfonic acid can also be used in the form of being copolymerized with other copolymerizable monomers such as acrylic acid ester, methacrylic acid ester, and styrene. The molecular weight of the polymer carboxylic acid or the polymer sulfonic acid used as the polyanion is not particularly limited, but from the viewpoint of stability and conductivity of the coating agent, the mass average molecular weight thereof is preferably 1,000 to 1,000,000, and more preferably 5,000 to 150,000. Alkali salts such as lithium salts and sodium salts, ammonium salts, and the like may be partially contained as long as the characteristics of the present invention are not impaired. Even in the case of neutralized salts, the equilibrium of the polystyrene sulfonic acid and ammonium salts, which function as very strong acids, is known to shift to the acidic side due to the progress of the equilibrium reaction after neutralization, which can be considered to act as a dopant.

The content of the polyanion is preferably in excess of that of the polythiophene or polythiophene derivatives in terms of solid content mass ratio from the viewpoint of conductivity, and is preferably 1 to 5 parts by mass, and more preferably 1 to 3 parts by mass, relative to 1 part by mass of the polythiophene or polythiophene derivatives. The composition composed of the polythiophene or polythiophene derivatives and the polyanion is exemplified in Japanese Patent Laid-Open No. H06-295016, Japanese Patent Laid-Open No. H07-292081, Japanese Patent Laid-Open No. H01-313521, Japanese Patent Laid-Open No. 2000-006324, European Patent No. EP602731, U.S. Pat. No. 5,391,472, and the like. However, other than these may be used. As an example, an alkali metal salt of 3,4-dihydroxy-thiophene-2,5-dicarboxy ester is used as a starting material to obtain 3,4-ethylenedioxythiophene, and then potassium peroxodisulfate, iron sulfate, and the previously obtained 3,4-ethylenedioxythiophene are introduced in and reacted with an aqueous polystyrene sulfonic acid solution, thereby obtaining a composition in which a polythiophene such as poly(3,4-ethylenedioxythiophene) is complexed with a polyanion such as a polystyrene sulfonic acid.

There is also an example described in "Latest Trends in Conductive Polymer Technology" (1st printing, Jun. 1, 1999, published by Toray Research Center, Inc.).

(Binder Polymer)

The binder polymer constituting the crosslinking resin layer composition is defined as a polymer compound having a number average molecular weight (Mn) of 1,000 or more, as measured by gel permeation chromatography (GPC) according to the polymer compound safety evaluation flow scheme (sponsored by the Chemical Substances Council in November 1985), and having film-forming properties.

The binder polymer constituting the crosslinking resin layer composition may be a thermosetting resin or a thermoplastic resin as long as it can be compatible with or mixed and dispersed with ionic polymers. Examples thereof include polyesters such as polyethylene terephthalate, polybutylene terephthalate, and polyethylene naphthalate; polyimides such as polyimide and polyamide-imide; polyamides such as polyamide 6, polyamide 6,6, polyamide 12, and polyamide 11; fluororesins such as polyvinylidene fluoride, polyvinyl fluoride, polytetrafluoroethylene, ethylene tetrafluoroethylene copolymer, and polychlorotrifluoroethylene; vinyl resins such as polyvinyl alcohol, polyvinyl ether, polyvinyl butyral, polyvinyl acetate, and polyvinyl chloride; epoxy resins; oxetane resins; xylene resins; aramid resins; polyimide silicones; polyurethanes; polyureas; melamine resins; phenol resins; polyethers; acrylic resins, and copolymers of these. These may be used singly or in combination of two or more types thereof. However, it is not limited to these.

The binder polymer may be dissolved in an organic solvent as a raw material, may be made into an aqueous solution by adding a functional group such as a hydroxyl group, a sulfo group, or a carboxy group, or may be water-dispersed in combination with a surfactant. The binder polymer may be used in combination with a crosslinking agent, a curing agent such as a polymerization initiator, a polymerization accelerator, a solvent, a viscosity modifier, and the like, if necessary.

Among the binder polymers, it is preferable to use one or more selected from a polyester resin, an acrylic resin, an urethane resin, and a vinyl resin from the viewpoint of adhesion to the mold release layer.

The content of the binder polymer in the crosslinking resin layer composition is preferably 5% by mass to 90% by mass, more preferably 10% by mass to 70% by mass, and even more preferably 10% by mass to 60% by mass, in terms of solid content mass ratio. When the content of the binder polymer falls within the above range, the strength of the resulting crosslinking resin layer and the adhesion to the mold release layer can be sufficiently obtained.

(Crosslinking Agent)

The crosslinking resin layer composition may contain a crosslinking agent, if necessary.

The crosslinking agent mainly improves the cohesiveness, surface hardness, scratch resistance, solvent resistance, water resistance, and the like of the crosslinking resin layer by crosslinking reactions with functional groups contained in other resins or compounds, or by self-crosslinking.

As the crosslinking agent, any type of crosslinking agent can be used. For example, melamine compounds, guanamine-based, alkylamide-based, and polyamide-based compounds, glyoxal-based, carbodiimide compounds, epoxy compounds, oxazoline compounds, aziridine compounds, isocyanate compounds, silane coupling agents, dialcohol aluminate-based coupling agents, dialdehyde compounds, zircoaluminate-based coupling agents, peroxides, heat- or photo-reactive vinyl compounds, photosensitive resins, and the like are suitable for use. Among them, it is preferable to use crosslinking agents or silane coupling agents composed of melamine compounds or epoxy compounds, from the viewpoint of synergistically obtaining good adhesion to the mold release layer.

These crosslinking agents also include polymer-type crosslinking reactive compounds having reactive groups in other polymer skeletons, and in the present invention, one or two or more of these crosslinking agents may be used in combination.

The content of the crosslinking agent in the crosslinking resin layer composition is preferably 1% by mass to 90% by mass, more preferably 3% by mass to 50% by mass, and even more preferably 5% by mass to 40% by mass, in terms of solid content mass ratio. When the ratio of the crosslinking agent falls within the above range, adhesion to the mold release layer can be sufficiently obtained by synergistic action with the binder polymer.

(Particles)

The crosslinking resin layer may contain particles for the purpose of improving the adhesiveness and slipperiness of the crosslinking resin layer.

The average particle diameter of the particles is not particularly limited. For example, when used for optical applications, it is preferably 1.0 µm or less, more preferably 0.5 µm or less, and even more preferably 0.2 µm or less, from the viewpoint of film transparency. It is also preferably 0.01 µm or more from the viewpoint of improving the adhesiveness and slipperiness of the crosslinking resin layer.

Specific examples of the particles include inert inorganic particles such as silica, alumina, calcium carbonate, and titanium dioxide, fine particles obtained from polystyrene-based resins, polyacrylic resins, and polyvinyl-based resins, and organic particles represented by crosslinked particles of these.

The average particle diameter of the particles can be measured as follows.

The average particle diameter of the particles serving as raw materials can be measured as the average particle diameter (D50) obtained from the volume-based particle size distribution measured by a dynamic light scattering method or the like.

The average particle diameter of the particles in the state of being contained in the crosslinking resin layer can be determined as the average value of the diameters of 10 or more particles measured by observing the surface or cross-section of the crosslinking resin layer using an optical microscope or a scanning electron microscope (SEM). In this case, when the cross-sectional shape is elliptical, the measurement can be performed by defining the average value of the longest diameter and the shortest diameter as the diameter of each particle.

(Others)

The crosslinking resin layer may contain a surfactant, a defoaming agent, a coatability improving agent, a mold release agent, a thickener, an organic lubricant, an antistatic agent, a conductive agent, an ultraviolet and other light absorber, an antioxidant, a foaming agent, a dye, a pigment, and the like, if necessary.

The components in the crosslinking resin layer can be analyzed by the method such as TOF-SIMS, ESCA, or fluorescent X-rays.

(Method for Forming Crosslinking Resin Layer)

The crosslinking resin layer may be formed by in-line coating in which the film surface is treated during the stretching process of the polyester film, or by off-line coating in which the film once produced is coated outside the system. The in-line coating is preferably used since the coating can be performed at the same time as film forming, so that manufacturing can be handled inexpensively, and the thickness of the crosslinking resin layer can be changed depending on the stretching ratio.

The in-line coating is not limited to the following, but for example, in sequential biaxial stretching, a coating treatment can be applied particularly before the transverse stretching after the longitudinal stretching. When the crosslinking resin layer is formed on the polyester film by in-line coating, the coating can be performed at the same time as the film forming, and the crosslinking resin layer can be treated at high temperatures, so that a film suitable as the polyester film can be produced.

When the crosslinking resin layer is formed by in-line coating, the coating liquid is preferably coated on the polyester film as an aqueous solution or an aqueous dispersion of the crosslinking resin layer composition containing the above-mentioned series of compounds. In addition, a small amount of organic solvent may be contained in the coating liquid for the purpose of improving dispersibility in water, film-forming properties, and the like, as long as the gist of the present invention is not impaired. The organic solvent may be used singly or in combination of two or more types thereof.

The content of the organic solvent in the coating liquid is preferably 10% by mass or less, and more preferably 5% by mass or less. Specific examples of the organic solvent include aliphatic or alicyclic alcohols such as n-butyl alcohol, n-propyl alcohol, isopropyl alcohol, ethyl alcohol, and methyl alcohol; glycols such as propylene glycol, ethylene glycol, and diethylene glycol; glycol derivatives such as n-butyl cellosolve, ethyl cellosolve, methyl cellosolve, and propylene glycol monomethyl ether; ethers such as dioxane and tetrahydrofuran; esters such as ethyl acetate and amyl acetate; ketones such as methyl ethyl ketone and acetone; and amides such as N-methylpyrrolidone.

In addition, regardless of the off-line coating or the in-line coating, heat treatment and irradiation of active energy rays such as ultraviolet irradiation may be used in combination, if necessary.

Examples of the method for forming the crosslinking resin layer include conventionally known coating methods, such as gravure coating, reverse roll coating, die coating, air doctor coating, blade coating, rod coating, bar coating, curtain coating, knife coating, transfer roll coating, squeeze coating, curtain coating, impregnation coating, kiss coating, spray coating, calender coating, and extrusion coating.

(Thickness of Crosslinking Resin Layer)

The thickness of the crosslinking resin layer is preferably 0.01 to 3 µm, more preferably 0.02 µm or more or 1 µm or less, and even more preferably 0.03 µm or more or 0.3 µm or less when viewed as the final film, from the viewpoint of exhibiting various functionalities.

The coating amount of the coating liquid containing the crosslinking resin layer composition is usually 0.01 to 3 g/m$^2$, preferably 0.01 to 1 g/m$^2$, and more preferably 0.01 to 0.3 g/m$^2$. When the coating amount is 0.01 g/m$^2$ or more, sufficient performance can be obtained in terms of adhesion to the mold release layer (easy adhesion performance) and antistatic performance; and when the coating amount is 3 g/m$^2$ or less, the crosslinking resin layer can have good appearance and transparency, and there is no possibility of causing a decrease in productivity due to film blocking or reduced production line speed.

In the present invention, the coating amount can be calculated from the liquid mass per coating time (before drying), the non-volatile content concentration of the coating liquid, the coating width, the stretching ratio, the production line speed, and the like.

<Laminated Film (2)>

Examples of the "laminated film having a functional layer" include a mold release film having an "other mold release layer" on one side of the present substrate film (referred to as "laminated film (2)").

As an example of the "other mold release layer", a layer sequentially having a first layer formed from a silicone composition containing the (B) curable silicone having no fluorine substituent as a main component, and a second layer containing a component having a fluorine substituent, can be cited.

As another example of the "other mold release layer", a layer formed from a silicone composition containing the (A) curable silicone having a fluorine substituent as a main component, can be cited.

As another example of the "other mold release layer", a layer formed from a silicone composition containing the (B) curable silicone having no fluorine substituent as a main component, can also be cited. Here, the term "main component" means the component having the largest mass ratio among the constituent components.

<Applications of Present Film Laminate>

The present film laminate is preferably used for bonding in-vehicle members from the perspective of being able to use a silicone adhesive having good durability and transparency.

<Method for Using Present Mold Release Film and Present Film Laminate>

The present mold release film has excellent releasability with respect to a silicone adhesive, and thus, it can be used as a lightly peelable film for a silicone adhesive as follows.

That is, in the film laminate having a configuration in which the present mold release film (referred to as "lightly peelable film") is laminated on one side of a silicon adhesive layer composed of a silicone adhesive, and a mold release film (referred to as "heavily peelable film") having a peeling strength higher than that of the above-mentioned mold release film is laminated on the other side of the silicon adhesive layer, the lightly peelable film is peeled off to then bond the exposed surface of the silicone adhesive layer to an "adherend", and the heavily peelable film is peeled off after curing the silicone adhesive layer. However, it is not limited to such usage.

Examples of the adherend include various kinds of process paper, interleaf paper, and an optical member.

Examples of the optical member include a polarizing plate and a touch sensor.

The present film laminate can also be used for in-vehicle applications, such as touch panels installed in automobiles, by utilizing the heat resistance, cold resistance, weather resistance, and high transparency of the silicone adhesive itself.

(Silicone Adhesive)

The silicone adhesive may be any adhesive containing silicone as a main component resin.

The term "main component resin" means a resin having the largest content ratio (mass) among the resins constituting the adhesive.

Examples of the silicone adhesive include addition reaction-type, peroxide curing-type, and condensation reaction-type silicone adhesives. Among them, addition reaction-type silicone adhesives can be preferably used from the viewpoint that they can be cured at a low temperature in a short time. These addition reaction-type silicone adhesives are cured at the time of forming the adhesive layer on a support.

When an addition reaction-type silicone adhesive is used as the silicone adhesive, the silicone adhesive may contain a catalyst such as a platinum catalyst.

For example, the above-mentioned addition reaction-type silicone adhesive can be diluted with a solvent such as toluene, if necessary, to obtain a silicone resin solution. The silicone resin solution can be then added with a catalyst such as a platinum catalyst and stirred to be uniformly mixed, and the mixture can be coated on a support and cured at 100° C. to 130° C. for 1 to 5 minutes.

Also, if necessary, the addition reaction-type silicone adhesive may be added with a crosslinking agent or an additive for controlling the adhesive force, or the support may be subjected to a primer treatment before the formation of the adhesive layer.

Examples of the commercially available products of the silicone resin used for the addition reaction-type silicone adhesive include SD4580PSA, SD4584PSA, SD4585PSA, SD4587LPSA, SD4560PSA, SD4570PSA, SD4600FCPSA, SD4593PSA, DC7651 ADHESIVE, DC7652 ADHESIVE, LTC-755, and LTC-310 (all manufactured by Toray Dow Corning Co., Ltd.); KR-3700, KR-3701, X-40-3237-1, X-40-3240, X-40-3291-1, X-40-3229, X-40-3323, X-40-3306, and X-40-3270-1 (all manufactured by Shin-Etsu Chemical Co., Ltd.); AS-PSA001, AS-PSA002, AS-PSA003, AS-PSA004, AS-PSA005, AS-PSA012, AS-PSA014, and PSA-7465 (all manufactured by Arakawa Chemical Industries, Ltd.); and TSR1512, TSR1516, and TSR1521 (all manufactured by Momentive Performance Materials Inc.). However, it is not limited to these.

(Polarizing Plate)

The material and configuration of the polarizing plate are arbitrary. For example, those in which a TAC (triacetyl cellulose) film serving as a protective film is laminated on a stretched polyvinyl alcohol film that uses iodine as an orientation dye, are widely used for this type of polarizing plate.

The polarizing plate may also have a layer structure having functions such as hard coating having substantially no phase difference, antiglare, low reflection, and antistatic, on the surface.

(Touch Sensor)

The touch sensor is, when a user touches the image displayed on the screen with a finger or a stylus, a member that reacts to the contact and grasps the touch point, and depending on the sensor technology, methods such as a capacitance method, a resistive film method, and a surface wave method using infrared rays or ultrasonic waves, are exemplified.

In general, the touch sensor is installed in display devices such as a liquid crystal display panel and an organic EL.

In recent years, there has been a trend to use a substrate film as a substitute for glass substrates, focusing on its flexibility.

Touch sensor films are generally provided with a patterned transparent conductive layer for exerting the function of sensing electrodes.

<Explanation of Terms and Phrases>

According to the definition of Japanese Industrial Standard (JIS), a "sheet" is generally a thin and flat product having a thickness that is smaller than the length and the width thereof, and a "film" is generally a product having a thickness that is extremely smaller than the length and the width thereof, and having a maximum thickness that is arbitrarily determined, which is generally supplied in the form of a roll (Japanese Industrial Standard, JIS K6900). However, there is no definite boundary between the sheet and the film, and there is no need of literally distinguishing these terms. In the present invention, accordingly, the case referred to as a "film" is assumed to include a "sheet", and the case referred to as a "sheet" is assumed to include a "film".

In the case of being described as the phrase "X to Y" (X and Y are arbitrary numbers) in the present invention, the phrase includes the meaning of "preferably more than X" or "preferably less than Y" along with the meaning "X or more and Y or less", unless otherwise stated.

Also, the phrase "X or more" (X is an arbitrary number) or "Y or less" (Y is an arbitrary number) includes the meaning "preferably more than X" or "preferably less than Y", unless otherwise stated.

EXAMPLES

Hereinafter, the present invention will be specifically described with reference to Examples. The present invention is not limited to the following Examples.

<Evaluation Methods>

(1) Normal-State Peeling Force

An adhesive tape "silicone adhesive-equipped polyimide tape No. 5413 (manufactured by 3M)" was bonded to the mold release surface of a sample film at a width of 5 cm, and the normal-state peeling force was measured using a peeling tester under the conditions of 180° peeling and 0.3 m/min peeling speed in an environment of room temperature (23° C.)

(2) Heat Peeling Force

An adhesive tape "silicone adhesive-equipped polyimide tape No. 5413 (manufactured by 3M)" was bonded to the mold release surface of a sample film, and the sample was then cut into a size of 50 mm × 300 mm and heat-treated at 100° C. for 1 hour in a hot air oven. The sample was then taken out therefrom, and left to stand at room temperature (23° C.) for 1 hour to measure the peeling force.

The peeling force was measured using "EZ Graph" manufactured by Shimadzu Corp. under the conditions of 180° peeling and 0.3 (m/min) peeling speed at room temperature (23° C.)

It can be evaluated that the lower the value of the heat peeling force, the better the peeling characteristics.

(3) Residual Adhesion Rate (Substitute Evaluation of Mold Release Layer Migration)

A silicone adhesive-equipped tape ("No. 5413", manufactured by 3M)" was bonded to the mold release surface of a sample film using a 2 kg rubber roller, and the tape was then cut into a size of 50 mm×250 mm to obtain a sample for measuring the residual adhesion rate. The sample was heat-treated in an oven heated to 100° C. for 1 hour, and then cut into a width of 20 mm and left to stand at room temperature and normal humidity for 1 hour. The adhesive tape peeled off from the measurement sample was press-bonded to a cleaned stainless steel plate (60 mm×150 mm) using a rubber roller.

The peeling force was measured using "EZ Graph" manufactured by Shimadzu Corp. under the conditions of 180° peeling and 0.3 (m/min) peeling speed at room temperature (23° C.)

Then, the peeling force of the measured residual adhesive rate evaluation film and the peeling force of the reference film (a sample in which the No. 5413 tape was bonded to a Naflon tape instead of the sample film) were substituted into the following formula to obtain the residual adhesive rate (%).

Residual adhesion rate (%)=(peeling force of migration evaluation film/peeling force of reference film)×100

(4) Fluorine Atom Concentration (atom %) in Thickness Direction Within Mold Release Layer Using XPS (X-ray photoelectron spectroscopy) with GC-IB (gas cluster ion beam), the concentration distribution (ratio) of carbon (C), oxygen (O), silicon (Si), and fluorine (F) atoms in the thickness direction within the mold release layer of the sample film was measured under a constant sputtering speed (sputter condition setting).

In this case, the XPS setting conditions were as follows.
Apparatus: PHI 5000 Versa Probe II, manufactured by ULVAC-PHI, Inc.
=Analysis Conditions=
X-ray intensity: AlKα/15 kV·25 W
Measuring area: 100 μmφ)
Path energy: 58.70 eV
Charging correction: 284.6 eV (C1s)
=Sputtering Conditions=
Ar-GCIB
10 kV, 60 minutes (3 minute intervals, 20 levels)

The obtained fluorine atom concentration distribution (vertical axis: fluorine atom concentration (atom %), horizontal axis: sputtering time (min)) was evenly divided into 9 sections by the total sputtering time to determine a first measurement point (sputtering time of 0 seconds, mold release layer surface) to a tenth measurement point (ground layer, reaching the substrate PET film), thereby obtaining a fluorine atom concentration (atom %) at each measurement point.

Then, the ratio (%) of the fluorine atom concentration (atom %) at the second measurement point to the fluorine atom concentration (atom %) at the first measurement point, as well as the ratio (%) of the average fluorine atom concentration (atom %) of the sixth to tenth measurement points to the fluorine atom concentration (atom %) at the first measurement point were calculated. The results are shown in Table 1.

EXAMPLE 1

The following (A) curable silicone having a fluorine substituent, the following (C1) silicone crosslinking agent, and the following (D1) curing catalyst 1 were mixed to prepare a solution a1. The solution a1 was stirred for 1 minute, and the following solution b1 ((B) curable silicone having no fluorine substituent+(D2) curing catalyst 2) was mixed thereto so as to have a mass ratio (solution a1:solution b1) of 1:2, thereby preparing a coating liquid A1 having a solid content concentration of 3.6% by mass.

Then, the coating liquid A1 was coated on one surface of a substrate film (PET film "T100-38" with a thickness of 38 μm, manufactured by Mitsubishi Chemical Co., Ltd.,) using a No. 4 bar, and cured by heat-treating at 150° C. for 15 seconds to obtain a mold release film (sample film) provided with a mold release layer.

(Mold Release Layer Composition)
Solution a1:
(A) Curable Silicone Having Fluorine Substituent
("3062" manufactured by Toray Dow Corning Co., Ltd., 10% by mass, viscosity of 10 mm²/s) 100 parts by mass (C1) Silicone Crosslinking Agent Having No Fluorine Substituent
("3062A" manufactured by Toray Dow Corning Co., Ltd.) 0.50 part by mass
(D1) Platinum Catalyst 1
("FSXK-3077" manufactured by Toray Dow Corning Co., Ltd.) 0.50 part by mass
Diisopropyl ether/ethyl acetate (3: 7)
Solution b1:
(B) Curable Silicone Having No Fluorine Substituent
("KS-847H" manufactured by Shin-Etsu Chemical Co., Ltd., solvent-type, 30% by mass, containing crosslinking agent/reaction control agent, viscosity of 11,000 mPa·s (25° C.)) 67 parts by mass
(D2) Platinum Catalyst 2
("CAT-PL-50T" manufactured by Shin-Etsu Chemical Co., Ltd.) 0.67 part by mass
Diisopropyl ether/ethyl acetate (3: 7)

EXAMPLE 2 to EXAMPLE 5>

Mold release films (sample films) were obtained in the same manner as in Example 1 except that the solution a1 was stirred for 1 minute and the standing periods as shown in the table were added in Example 1, respectively.

Example 6

A mold release film (sample film) was obtained in the same manner as in Example 1 except that the solution a1 was prepared at a solid content concentration of 10% by mass, stirred for 1 minute, left to stand for another 15 minutes, and then diluted with a solvent to have a solid content concentration of 3.6% by mass, in Example 1.

Comparative Example 1

A mold release film (sample film) was obtained in the same manner as in Example 1 except that no stirring was performed at all, in Example 1.

Here, the "no stirring was performed at all" means that "the (C1) silicone crosslinking agent and the (D1) curing catalyst 1 were mixed to prepare the solution a1, and then the solution b1 was immediately mixed thereto without stirring, to prepare the coating liquid A1".

Comparative Example 2

A mold release film (sample film) was obtained in the same manner as in Example 1 except that the (B) curable silicone having no fluorine substituent and the (D2) curing catalyst 2 were not mixed in Example 1.

Comparative Example 3>

A mold release film (sample film) was obtained in the same manner as in Example 2 except that 0.5 part by mass of a (C2) crosslinking agent having a fluorine substituent ("3062C" manufactured by Toray Dow Corning Co., Ltd.) was blended instead of the (C1) silicone crosslinking agent having no fluorine substituent in Example 2.

Comparative Example 4

A mold release film (sample film) was obtained in the same manner as in Example 1 except that 0.5 part by mass of a (C2) crosslinking agent having a fluorine substituent ("3062C" manufactured by Toray Dow Corning Co., Ltd.) was blended instead of the (C1) silicone crosslinking agent having no fluorine substituent in Comparative Example 2.

Comparative Example 5

A solution b2 was prepared by blending and mixing 100 parts by mass of TPR6600 (manufactured by Momentive) as a curable silicone having no fluorine substituent (including a crosslinking agent having no fluorine substituent) with 3 parts by mass of LC600 (manufactured by Momentive) as a curing catalyst.

A solution a2 was prepared by blending and mixing 100 parts by mass of BY24-900 (manufactured by Toray Dow Corning Co., Ltd.) as a curable silicone having a fluorine substituent (including a crosslinking agent) with 0.5 part by mass of NC-25 (manufactured by Toray Dow Corning Co., Ltd.) as a curing catalyst.

Next, 100 parts by mass of the solution a2 containing the curable silicone having a fluorine substituent and 100 parts by mass of the solution b2 containing the curable silicone having no fluorine substituent were blended and mixed, and then a solvent in which n-heptane and methyl isobutyl ketone were mixed at a weight ratio of 1:1 was added thereto to dissolve the polymer components, thereby preparing a coating liquid A2 having a solid content concentration of 3.0% by mass.

No stirring was performed at all before mixing the solution a2 and the solution b2.

Here, the "no stirring was performed at all" means that "the solution a2 was prepared, and then the solution b2 was immediately mixed thereto without stirring, to prepare the coating liquid A2".

Then, the coating liquid A2 was coated on one surface of a substrate film (PET film "T100-38" with a thickness of 38 μm, manufactured by Mitsubishi Chemical Co., Ltd.,) using a No. 10 bar, and cured by heat-treating at 120° C. for 120 seconds to obtain a mold release film (sample film) provided with a mold release layer.

Comparative Example 6

A solution a2 was prepared by blending and mixing 100 parts by mass of BY24-900 (manufactured by Toray Dow Corning Co., Ltd.) as a curable silicone having a fluorine substituent (including a crosslinking agent) with 0.5 part by mass of NC-25 (manufactured by Toray Dow Corning Co., Ltd.) as a curing catalyst.

A solvent in which n-heptane and methyl isobutyl ketone were mixed at a weight ratio of 1:1 was added to the solution a2 to dissolve the polymer components, thereby preparing a coating liquid A3 having a solid content concentration of 3.6% by mass.

Then, the coating liquid A3 was coated on one surface of a substrate film (PET film "T100-38" with a thickness of 38 μm, manufactured by Mitsubishi Chemical Co., Ltd.,) using a No. 4 bar, and cured by heat-treating at 120° C. for 120 seconds to obtain a mold release film (sample film) provided with a mold release layer.

TABLE 1

| | Items | Units | Example 1 | Example 2 | Example 5 | Comparative Example 1 | Comparative Example 2 | Comparative Example 3 | Comparative Example 5 | Comparative Example 6 |
|---|---|---|---|---|---|---|---|---|---|---|
| Solution a | (A) Curable silicone having a fluorine substituent | product No. | 3062 | 3062 | 3062 | 3062 | 3062 | 3062 | BY 24-900 | BY 24-900 |
| | | parts | 100 | 100 | 100 | 100 | 100 | 100 | 100 | 100 |
| | (C1) Silicone crosslinking agent having no fluorine substituent | product No. | 3062A | 3062A | 3062A | 3062A | 3062A | — | — | — |
| | | parts | 0.50 | 0.50 | 0.50 | 0.50 | 0.50 | — | — | — |
| | (C2) Silicone crosslinking agent having a fluorine substituent | — | — | — | — | — | — | 3062C | — | — |
| | | parts | — | — | — | — | — | 0.50 | — | — |
| | (D1) Curing catalyst 1 | product No. | FS XK-3077 | FS XK-3077 | FS XK-3077 | FS XK-3077 | FS XK-3077 | FS XK-3077 | NC-25 | NC-25 |
| | | parts | 0.50 | 0.50 | 0.50 | 0.50 | 0.50 | 0.50 | 0.50 | 0.50 |
| Solution b | (B) Curable silicone having no fluorine substituent (including silicone crosslinking agent having no fluorine substituent) | product No. | KS-847H | KS-847H | KS-847H | KS-847H | — | KS-847H | TPR6600 | — |
| | | parts | 67 | 67 | 67 | 67 | — | 67 | 100 | — |
| | (D2) Curing catalyst 2 | product No. | PL-50T | PL-50T | PL-50T | PL-50T | — | PL-50T | CL600 | — |
| | | parts | 0.67 | 0.67 | 0.6 | 0.67 | — | 0.67 | 3.0 | — |
| | Solution A [(A) + (C1) + (D1 or D2)] Solid content concentration | % by mass | 3.6 | 3.6 | 3.6 | 3.6 | 3.6 | 3.6 | 10 | — |

TABLE 1-continued

| Items | Units | | | | | | | | |
|---|---|---|---|---|---|---|---|---|---|
| Solution A [(A) + (C1) + (D1 or D2)] Pre-crosslinking period during pre-crosslinking | min | 1 (stirring) | 1 (stirring) → 15 (standing) | 1 (stirring) → 120 (standing) | 0 | — | 1 (stirring) → 15 (standing) | 0 | — |
| Solution A [(A) + (C1) + (D1 or D2)]: Solution B [(B) + (C2)] Mixing ratio (solid content weight ratio) | — | 1:2 | 1:2 | 1:2 | 1:2 | — | 1:2 | 1:1 (solid content weight ratio 1:10) | — |
| Solid content concentration of coating liquid | % by mass | 3.6 | 3.6 | 3.6 | 3.6 | 3.6 | 3.6 | 3.0 | 3.6 |

| Items | Units | Example 1 | Example 2 | Example 3 | Example 4 | Example 5 | Example 6 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|
| Solution A [(A) + (C1) + (D1 or D2)] Solid content concentration during pre-crosslinking | % by mass | 3.6 | 3.6 | 3.6 | 3.6 | 3.6 | 10 | 3.6 | 3.6 | 36 | 36 | 10 | — |
| Solution A [(A) + (C1) + (D1 or D2)] Pre-crosslinking period | min | 1 (stirting) | 1 (stirting) → 15 (standing) | 1 (stirting) → 30 (standing) | 1 (stirting) → 60 (standing) | 1 (stirting) → 120 (standing) | 1 (stirting) → 15 (standing) | 0 | — | 1 (stirting) → 15 (standing) | — | 0 | — |
| Solution A [(A) + (C1) + (D1 or D2)]: Solution B [(B) + (C2)] Mixing ratio (solid content weight ratio) | — | 1:2 | 1:2 | 1:2 | 1:2 | 1:2 | 1:2 | 1:2 | — | 1:2 | — | 1:1 (solid content weight ratio 1:10) | — |
| Solid content concentration of coating liquid | % by mass | 3.6 | 3.6 | 3.6 | 3.6 | 3.6 | 3.6 | 3.6 | 3.6 | 3.6 | 3.6 | 3.0 | 3.6 |
| Normal-state peeling force | mN/cm | 72 | 32 | 34 | 36 | 37 | 35 | 78 | 67 | 77 | 43 | 77 | 43 |
| Heat peeling force | mN/cm | 73 | 39 | 45 | 53 | 55 | 37 | 104 | 85 | 102 | 60 | 102 | 60 |
| Residual adhesion rate | % | 80 | 101 | 102 | 103 | 102 | 105 | 69 | 95 | 92 | 87 | 92 | 87 |

TABLE 2

| | Items | Units | Example 1 | Example 2 | Example 3 | Example 4 | Example 5 |
|---|---|---|---|---|---|---|---|
| Solution a | (A) Curable silicone having a fluorine substituent | product No. | 3062 | 3062 | 3062 | 3062 | 3062 |
| | | parts | 100 | 100 | 100 | 100 | 100 |
| | (C1) Silicone crosslinking agent having no fluorine substituent | product No. | 3062A | 3062A | 3062A | 3062A | 3062A |
| | | parts | 0.50 | 0.50 | 0.50 | 0.50 | 0.50 |
| | (C2) Silicone crosslinking agent having a fluorine substituent | product No. | — | — | — | — | — |
| | | parts | — | — | — | — | — |
| | (D1) Curing catalyst 1 | product No. | FS XK-3077 | FS XK-3077 | FS XK-3077 | FS XK-3077 | FS XK-3077 |
| | | parts | 0.50 | 0.50 | 0.50 | 0.50 | 0.50 |
| Solution b | (B) Curable silicone having no fluorine substituent | product No. | KS-847H | KS-847H | KS-847H | KS-847H | KS-847H |

TABLE 2-continued

| | Items | Units | | | | | |
|---|---|---|---|---|---|---|---|
| | (including silicone crosslinking agent having no fluorine substituent) | parts | 67 | 67 | 67 | 67 | 67 |
| | (D2) Curing catalyst 2 | product No. | PL-50T | PL-50T | PL-50T | PL-50T | PL-50T |
| | | parts | 0.67 | 0.67 | 0.67 | 0.67 | 0.67 |
| | Solution A [(A) + (C1) + (D1 or D2)] Solid content concentration during pre-crosslinking | % by mass | 3.6 | 3.6 | 3.6 | 3.6 | 3.6 |
| | Solution A [(A) + (C1) + (D1 or D2)] Pre-crosslinking period | min | 1 (stirring) → | 1 (stirring) → 15 (standing) | 1 (stirring) → 30 (standing) | 1 (stirring) → 60 (standing) | 1 (stirring) → 120 (standing) |
| | Solution A [(A) + (C1) + (D1 or D2)]:Solution B [(B) + (C2)] Mixing ratio (solid content weight ratio) | — | | 1:2 | 1:2 | 1:2 | 1:2 |
| | Solid content concentration of coating liquid | % by mass | 3.6 | 3.6 | 3.6 | 3.6 | 3.6 |
| | Normal-state peeling force | mN/cm | 72 | 32 | 34 | 36 | 37 |
| | Heat peeling force | mN/cm | 73 | 39 | 45 | 53 | 55 |
| | Residual adhesion rate | % | 80 | 101 | 102 | 103 | 102 |

| | Items | Units | Example 6 | Comparative Example 1 | Comparative Example 2 | Comparative Example 3 |
|---|---|---|---|---|---|---|
| Solution a | (A) Curable silicone having a fluorine substituent | product No. | 3062 | 3062 | 3062 | 3062 |
| | | parts | 100 | 100 | 100 | 100 |
| | (C1) Silicone crosslinking agent having no fluorine substituent | product No. | 3062A | 3062A | 3062A | — |
| | | parts | 0.50 | 0.50 | 0.50 | — |
| | (C2) Silicone crosslinking agent having a fluorine substituent | product No. | — | — | — | 3062C |
| | | parts | — | — | — | 0.50 |
| | (D1) Curing catalyst 1 | product No. | FS XK-3077 | FS XK-3077 | FS XK-3077 | FS XK-3077 |
| | | parts | 0.50 | 0.50 | 050 | 0.50 |
| Solution b | (B) Curable silicone having no fluorine substituent (including silicone crosslinking agent having no fluorine substituent) | product No. | KS-847H | KS-847H | — | KS-847H |
| | | parts | 67 | 67 | — | 67 |
| | (D2) Curing catalyst 2 | product No. | PL-50T | PL-50T | — | PL-50T |
| | | parts | 0.67 | 0.67 | — | 0.67 |
| | Solution A [(A) + (C1) + (D1 or D2)] Solid content concentration during pre-crosslinking | % by mass | 10 | 3.6 | 3.6 | 3.6 |
| | Solution A [(A) + (C1) + (D1 or D2)] Pre-crosslinking period | min | 1 (stirring) → 15 (standing) | 0 | — | 1 (stirring) → 15 (standing) |
| | Solution A [(A) + (C1) + (D1 or D2)]:Solution B [(B) + (C2)] Mixing ratio (solid content weight ratio) | — | | 1:2 | 1:2 | — | 1:2 |
| | Solid content concentration of coating liquid | % by mass | 3.6 | 3.6 | 3.6 | 3.6 |
| | Normal-state peeling force | mN/cm | 35 | 78 | 67 | 77 |
| | Heat peeling force | mN/cm | 37 | 104 | 85 | 102 |
| | Residual adhesion rate | % | 105 | 89 | 95 | 92 |

| | Items | Units | Comparative Example 4 | Comparative Example 5 | Comparative Example 6 |
|---|---|---|---|---|---|
| Solution a | (A) Curable silicone having a fluorine substituent | product No. | 3062 | BY 24-900 | BY 24-900 |
| | | parts | 100 | 100 | 100 |
| | (C1) Silicone crosslinking agent having no fluorine substituent | product No. | — | — | — |
| | | parts | — | — | — |
| | (C2) Silicone crosslinking agent having a fluorine substituent | product No. | 3062C | — | — |
| | | parts | 0.50 | — | — |
| | (D1) Curing catalyst 1 | product No. | FS XK-3077 | NC-25 | NC-25 |
| | | parts | 0.50 | 0.50 | 0.50 |
| Solution b | (B) Curable silicone having no fluorine substituent | product No. | — | TPR6800 | — |
| | (including silicone crosslinking agent having no fluorine substituent) | parts | — | 100 | — |
| | (D2) Curing catalyst 2 | product No. | — | CL800 | — |
| | | parts | — | 3.0 | — |
| | Solution A [(A) + (C1) + (D1 or D2)] Solid content concentration during pre-crosslinking | % by mass | 3.6 | 10 | — |

TABLE 2-continued

| | | | | |
|---|---|---|---|---|
| Solution A [(A) + (C1) + (D1 or D2)] Pre-crosslinking period | min | — | 0 | — |
| Solution A [(A) + (C1) + (D1 or D2)]:Solution B [(B) + (C2)] Mixing ratio (solid content weight ratio) | | — | 1:1 (solid content weight ratio 1:10) | — |
| Solid content concentration of coating liquid | % by mass | 3.6 | 3.0 | 3.6 |
| Normal-state peeling force | mN/cm | 43 | 77 | 43 |
| Heat peeling force | mN/cm | 60 | 102 | 60 |
| Residual adhesion rate | % | 87 | 92 | 87 |

<Consideration>

From the results of the Examples and the tests that have been so far conducted by the present inventors, it is found that, when the mold release layer formed on at least one side of the substrate film was formed by curing a mold release layer composition containing a (A) curable silicone having a fluorine substituent, a (B) curable silicone having no fluorine substituent, and a (D) curing catalyst, the mold release film had excellent light peelability that was easily peeled off from the silicone adhesive layer even if the amount of fluorinated silicone used was reduced.

Moreover, by investigating the common features of such mold release layers, it was able to be found that fluorine was unevenly distributed on the surface of the mold release layer in the concentration distribution of fluorine atoms in the thickness direction within the mold release layer.

More specifically, it was able to be found that, when the fluorine atom concentration distribution (vertical axis: fluorine atom concentration (atom %), horizontal axis: sputtering time (min)) obtained as in each Example was evenly divided into 9 sections by the total sputtering time to determine a first measurement point (sputtering time 0) and second to tenth measurement points, the fluorine atom concentration (atom %) at each of the second to tenth measurement points was 80.0% or less of the fluorine atom concentration (atom %) at the first measurement point (sputtering time 0).

Furthermore, it was able to be found that, when the average fluorine atom concentration (atom %) of the sixth to tenth measurement points was higher than 2.2% of the fluorine atom concentration (atom %) at the first measurement point (sputtering time 0), a further excellent effect, that is, an excellent light peelability that was easily peeled off from the silicone adhesive layer could be obtained even if the amount of fluorinated silicone used was reduced.

In addition, the following was found with regard to the method for forming a mold release layer.

It is confirmed that, when the solution obtained by mixing two types of the (A) curable silicone having a fluorine substituent and the (B) curable silicone having no fluorine substituent was coated onto the film and dried, the (A) curable silicone having a fluorine substituent, which was more hydrophobic, tended to segregate on the surface (air interface) side.

On the other hand, the silicone crosslinking agent and the catalyst used in combination did not have the same level of high hydrophobicity as the (A) curable silicone having a fluorine substituent due to their molecular structure. Therefore, they were not evenly dispersed in the film, and a mold release layer having a good cured state could not be obtained, or a large amount of the (B) curable silicone having no fluorine substituent could not be mixed.

In the present invention, the mold release layer composition was prepared by firstly mixing the (A) curable silicone having a fluorine substituent, the (C) silicone crosslinking agent, and the (D) curing catalyst, followed by subjecting to a "pre-treatment" of reacting the mixture by stirring and/or leaving to stand, and then mixing the pre-treated composition obtained by the pre-treatment with the (B) curable silicone having no fluorine substituent. With this configuration, it is found that, even when the (C1) silicone crosslinking agent having no fluorine substituent was used, the material could be uniformly dispersed, and a coating film that was easily peeled off (light peelability) from the silicone adhesive could be formed.

The details of this mechanism are unknown, but it is presumed that appropriate entanglement (pre-crosslinking) occurred in the blended liquid over time after the preparation of the blended liquid. Along with this, it is presumed that the (A) curable silicone having a fluorine substituent tended to be present more on the surface (air interface) side.

As a result, it is presumed that more fluorine substituents were unevenly distributed near the surface of the mold release layer even after coating on the film, so that a coating film having a light peeling property could be formed.

Furthermore, it is also found that since a larger amount of the (B) curable silicone having no fluorine substituent could be mixed, the total amount of fluorine atoms in the film could be further reduced in the process of forming the mold release layer film, and the mold release property could be efficiently exhibited.

The invention claimed is:

1. A mold release film, comprising:
   a mold release layer formed by curing a mold release layer composition comprising a curable silicone comprising a fluorine substituent, a curable silicone having no fluorine substituent, and a curing catalyst, on at least one surface of a substrate film,
   wherein a thickness of the mold release layer after drying is in a range of from 0.05 to 0.25 μm,
   wherein a mass ratio of the curable silicone having a fluorine substituent to the curable silicone having no fluorine substituent is in a range of from 1:50 to 10:1, and
   wherein, in a concentration distribution of fluorine atoms in a thickness direction within the mold release layer, fluorine atoms are unevenly distributed on a surface of the mold release layer, and a fluorine atom concentration on one side of the mold release layer is 39.0 atom concentration % or more.

2. A mold release film, comprising:
   a mold release layer formed by curing a mold release layer composition comprising a curable silicone comprising a fluorine substituent, a curable silicone having no fluorine substituent, and a curing catalyst, on at least one surface of a substrate film,
   wherein a thickness of the mold release layer after drying is in a range of from 0.05 to 0.25 μm, wherein a mass ratio of the curable silicone having a fluorine substituent to the curable silicone having no fluorine substituent is in a range of from 1:50 to 10:1, and wherein the mold release film has each fluorine atom concentration in atom % at second to tenth measurement points being 80.0% or less of a fluorine atom concentration in atom % at a first measurement point at a sputtering time 0, when a concentration distribution of fluorine atoms in a thickness direction within the mold release layer is measured under a constant sputtering speed by using X-ray photoelectron spectroscopy with gas cluster ion beam, and the concentration distribution of fluorine atoms plotted as vertical axis: fluorine atom concentration in atom %, and horizontal axis: sputtering time in minutes is evenly divided into 9 sections by a total sputtering time to determine the first measurement point at the sputtering time 0 and the second to tenth measurement points.

3. A mold release film, comprising:
a mold release layer formed by curing a mold release layer composition comprising a curable silicone comprising a fluorine substituent, a curable silicone having no fluorine substituent, and a curing catalyst, on at least one surface of a substrate film,
wherein a thickness of the mold release layer after drying is in a range of from 0.05 to 0.25 μm,
wherein a mass ratio of the curable silicone having a fluorine substituent to the curable silicone having no fluorine substituent is in a range of from 1:50 to 10:1, and
wherein the mold release film has an average fluorine atom concentration in atom % of sixth to tenth measurement points being higher than 2.2% of a fluorine atom concentration in atom % at a first measurement point at a sputtering time 0, when a concentration distribution of fluorine atoms in a thickness direction within the mold release layer is measured under a constant sputtering speed by using X-ray photoelectron spectroscopy with gas cluster ion beam, and the concentration distribution of fluorine atoms plotted as vertical axis: fluorine atom concentration in atom %, and horizontal axis: sputtering time in minutes is evenly divided into 9 sections by a total sputtering time to determine the first measurement point at the sputtering time 0 and the second to tenth measurement points.

4. The mold release film of claim 1, wherein the mold release layer composition comprises a silicone crosslinking agent.

5. The mold release film of claim 4, wherein the silicone crosslinking agent comprises a silicone crosslinking agent having no fluorine substituent.

6. The mold release film of claim 1, having a mass ratio of the curable silicone having a fluorine substituent to the curable silicone having no fluorine substituent in a range of from 1:20 to 5:1.

7. The mold release film of claim 1, wherein the mold release layer has a fluorine atom content of 500 ppm by mass or more and 800,000 ppm by mass or less.

8. The mold release film of claim 1, wherein the curable silicone having no fluorine substituent comprises a solvent-type curable silicone.

9. The mold release film of claim 1, wherein the mold release layer has a normal-state peeling force of 75 mN/cm or less and a residual adhesion rate of 80% or more.

10. The mold release film of claim 1, wherein the mold release layer has a heat peeling force of 100 mN/cm or less.

11. A method for producing the mold release film of claim 1, the method comprising:
mixing the curable silicone comprising the fluorine substituent, a silicone crosslinking agent, and the curing catalyst, followed by stirring and/or leaving to stand to form a mixture;
mixing the mixture with the curable silicone having no fluorine substituent to prepare the mold release layer composition; and
coating the mold release layer composition on the at least one surface of the substrate film.

12. A method for producing the mold release film of claim 1, the method comprising:
mixing the curable silicone comprising the fluorine substituent, a silicone crosslinking agent, and the curing catalyst, followed by stirring and/or leaving to stand for 1 minute or more to form a mixture;
mixing the mixture with the curable silicone having no fluorine substituent to prepare the mold release layer composition; and
coating the mold release layer composition on the at least one surface of the substrate film.

13. The method of claim 11, wherein the silicone crosslinking agent is a silicone crosslinking agent having no fluorine substituent.

14. A film laminate, comprising:
the mold release film according to claim 1 bonded to a laminated film comprising a functional layer via a silicone adhesive layer.

15. The film laminate of claim 14, wherein the laminated film having a functional layer comprises a laminated film having a crosslinking resin layer provided on at least one side of a substrate film.

16. The film laminate of claim 15, wherein the crosslinking resin layer comprises a conductive polymer and a binder polymer.

17. The film laminate of claim 14, wherein the laminated film further comprises a mold release film having a second mold release layer provided on one side of a substrate film.

18. The film laminate of claim 17, wherein the second mold release layer sequentially comprises:
a first layer comprising a silicone composition comprising a curable silicone having no fluorine substituent as a main component; and
a second layer comprising a component having a fluorine substituent.

19. The film laminate of claim 17, wherein the further mold release film comprises a silicone composition comprising a curable silicone comprising a fluorine substituent as a main component.

20. The film laminate of claim 17, wherein the second mold release layer comprises a silicone composition comprising a curable silicone having no fluorine substituent as a main component.

21. A method of one or more bonding in-vehicle members, the method-comprising:
applying, the film laminate of claim 14 to the one or more in-vehicle members.

22. A method for applying a film laminate, the method comprising:
peeling the mold release film of claim 1 to bond an exposed surface of a silicone adhesive layer to an adherend; and
peeling a second mold release film after curing the silicone adhesive layer, wherein the film laminate comprises the mold release film of claim 1 laminated on one side of the silicon adhesive layer, the second mold release film has a peeling strength higher than a peeling strength of the mold release film and is laminated on an other side of the silicon adhesive layer, and the silicon adhesive layer comprises a silicone adhesive.

23. The method of claim 22, wherein the adherend comprises an optical member.

24. The method of claim 23, wherein the optical member comprises a polarizing plate and a touch sensor.

25. The method of claim 23, wherein the optical member comprises an in-vehicle optical member.

26. The mold release film of claim 1, wherein the mold release layer has a fluorine atom content of 1,000 ppm by mass or more and 500,000 ppm by mass or less.

* * * * *